United States Patent
Löffler et al.

(10) Patent No.: US 7,554,279 B2
(45) Date of Patent: *Jun. 30, 2009

(54) METHOD FOR OPERATING AN ELECTRONICALLY COMMUTATED MOTOR, AND MOTOR FOR CARRYING OUT A METHOD SUCH AS THIS

(75) Inventors: Jens Löffler, Villingen-Schwenningen (DE); Arnold Kuner, St. Georgen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/091,478

(22) PCT Filed: Jun. 1, 2007

(86) PCT No.: PCT/EP2007/004845

§ 371 (c)(1), (2), (4) Date: Apr. 24, 2008

(87) PCT Pub. No.: WO2007/140927

PCT Pub. Date: Dec. 13, 2007

(65) Prior Publication Data

US 2008/0315807 A1   Dec. 25, 2008

(30) Foreign Application Priority Data

Jun. 3, 2006   (DE) .................. 10 2006 026 669

(51) Int. Cl.
H02P 6/16  (2006.01)
(52) U.S. Cl. ................ 318/400.07; 318/400.01; 318/400.26; 318/700
(58) Field of Classification Search ......... 318/400.07, 318/400.01, 700, 400.04
See application file for complete search history.

(56) References Cited

U.S. PATENT DOCUMENTS 4,374,347 A   2/1983   Müller ................ 318/138

(Continued)

FOREIGN PATENT DOCUMENTS

DE        23 46 380 B2    11/1974
WO        WO 2006-089605 A   8/2006

OTHER PUBLICATIONS

U.S. Appl. No. 11/816,828, filed Aug. 22, 2007, Föll & Jeske/EBM-P.
Bosch Automotive Handbook, 3$^{rd}$ Ed., 1993, p. 83, right column, magnetic energy equation.
MICROCHIP, Chandler AZ, PIC12F629/675 DataSheet 8-pin FLASH-Based 8-bit CMOS Microcontrollers, © 2003, 132 pages.

Primary Examiner—T C Patel
Assistant Examiner—Renata McCloud
(74) Attorney, Agent, or Firm—Milton Oliver; Oliver Intellectual Property LLC

(57) ABSTRACT

An electronically commutated motor (ECM 20) has terminals (56, 62) for connection to a DC power source (63). It has a permanent-magnet rotor (22), also a first and a second series circuit (40, 50) in each of which a stator winding strand (30, 32) is connected in series with a controllable semiconductor switch (34, 44), which two series circuits are connected in parallel to form a parallel circuit (52). In addition to the strand-connected switches (34, 44) typically found in an ECM, in a supply lead to said parallel circuit (52), a third controllable semiconductor switch (60) controls energy supply from the DC power source (63). In order to increase motor efficiency and minimize the size of any motor capacitor required, special switching steps are performed so that electromagnetic energy, remaining in the winding(s) after shutoff of power application, is converted into motor torque, instead of being dissipated as heat.

34 Claims, 17 Drawing Sheets

U.S. PATENT DOCUMENTS

| | | | |
|---|---|---|---|
| 5,223,775 A * | 6/1993 | Mongeau | 318/432 |
| 5,845,045 A * | 12/1998 | Jeske et al. | 388/804 |
| 6,046,554 A * | 4/2000 | Becerra | 318/400.34 |
| 6,188,187 B1 | 2/2001 | Harlan | 318/254 |
| 7,095,194 B2 * | 8/2006 | Kro et al. | 318/400.38 |
| 7,183,734 B2 * | 2/2007 | Lassen | 318/400.34 |
| 7,268,502 B2 * | 9/2007 | Dornhof | 318/400.38 |
| 2006/0006822 A1 * | 1/2006 | Kro et al. | 318/254 |
| 2006/0186846 A1 * | 8/2006 | Lassen | 318/439 |

* cited by examiner

METHOD FOR OPERATING AN ELECTRONICALLY COMMUTATED MOTOR, AND MOTOR FOR CARRYING OUT A METHOD SUCH AS THIS

CROSS-REFERENCE

This application is a section 371 of PCT/EP07/04845, filed 1 Jun. 2007, published 13 Dec. 2007 as WO 2007-140927-A.

FIELD OF THE INVENTION

The present invention relates to a method for operating an electronically commutated motor, and to a motor for carrying out such a method.

BACKGROUND

There are various designs for electronically commutated motors. One known classification system is based on the number of current pulses supplied to the stator of such a motor for each rotor revolution of 360° el. A distinction can therefore be made between one-pulse motors, in which only a single driving current pulse is supplied during one rotor revolution of 360° el.; two-pulse motors, in which two stator current pulses, which are usually spaced apart in time from one another, are supplied during one rotor revolution of 360° el.; and also three-pulse, six-pulse, etc. motors.

Such motors are further classified according to their number of stator winding strands, i.e. as one-strand, two-strand, three-strand motors, etc.

For complete definition of a design, the number of stator winding strands and the number of pulses per 360° el. must therefore be indicated, e.g. a two-pulse, two-strand motor. Borrowing from the terminology of motors that are operated with alternating or three-phase current, two-pulse motors are also referred to as single-phase motors; a single-phase motor can therefore have either one or two winding strands.

In a two-strand motor there is a first series circuit made up of a first winding strand and a first controllable semiconductor switch, and a second series circuit made up of a second winding strand and a second controllable semiconductor switch. Current is supplied alternately to the two winding strands in order to produce a magnetic field necessary for rotation of the permanent-magnet rotor. (In general, such a motor is also implemented to generate a so-called reluctance torque in the rotational position regions where the electrically generated torque has gaps; cf. for example DE 23 46 380 C2, Müller, corresponding to U.S. Pat. No. 4,374,347.)

A motor of this kind is usually operated from a direct current source, e.g. from a battery, a power supply, or a rectifier that rectifies the voltage of an alternating or three-phase power network and supplies it to a DC link circuit from which the motor is supplied with direct current. A capacitor, referred to as a link circuit capacitor, is usually connected to this link circuit.

When current flows through a winding strand, energy is stored in it in the form of a magnetic field. If the inductance in such a strand is designated L, and the current I, this energy can be calculated using the formula $$W = 0.5 * L * I^2 \qquad (1).$$

If a rotating magnetic field is to be generated by switching over from a first to a second winding strand (this being referred to as "commutation"), this stored energy must first be dissipated.

When a current-carrying winding strand is switched off, the effect of so-called self-induction at that winding strand is to cause a voltage rise that is brought about by the stored magnetic energy. Very high voltages can be caused as a result. Semiconductor switches having high dielectric strength must therefore be used.

A certain improvement can be achieved by using a link circuit capacitor, which serves to receive, in the form of electrical energy, the energy stored magnetically in the winding strand, and thereby to limit the voltage that occurs at the motor's DC link circuit. This capacitor therefore receives energy in operation and then immediately discharges it again; in other words, a current, also referred to as a "ripple current," continuously flows in the leads of this capacitor. The larger the capacitor required, the greater the ripple current becomes.

In terms of material costs, capacitors of this kind represent an economical solution to the aforementioned problem, but relatively large capacitors—usually so-called electrolyte capacitors—are required; their service life is limited, and is additionally reduced by the considerable heating that unavoidably occurs during the soldering operation and because of the ripple current. This decrease in the service life of the capacitor therefore has an effect on that of the motor.

A further possibility for limiting the voltage spikes that occur when a winding strand is switched off is to use Zener diodes or, when a FET (Field Effect Transistor) power stage is utilized, to exploit the so-called avalanche energy. Here the energy, that is stored upon shutoff in the winding strand that is to be switched off, is converted into heat in the aforesaid semiconductor elements. From the viewpoint of the semiconductor elements that are used, this is dissipated power, and components of appropriate performance must therefore be used.

The energy converted into heat is also "lost" and can no longer be used to drive the rotor, i.e. the efficiency of such a motor is lower.

SUMMARY OF THE INVENTION

It is therefore an object of the present invention to make available a novel method for operating an electronically commutated motor, as well as a novel motor for carrying out such a method.

According to a first aspect of the invention, this object is achieved by a method according to which an extra semiconductor switch is used to interrupt power supply to the motor before the strand-connected semiconductor switch is turned off, so that, during commutation, a circulating current briefly flows in the windings and thereby generates a driving torque in the motor, and the strand-connected switch is then turned off when that circulating current reaches a low predetermined absolute value. In the context of the invention, an additional controllable semiconductor switch is therefore used, which is arranged in the supply lead from the DC link circuit to the parallel circuit recited. This offers the possibility of switching off energy supply from an external DC power source to the motor at a favorable point in time, and of transforming the energy stored in the relevant winding strand, at the moment of shutoff, into motor torque, via a special recovery circuit. The energy stored in the relevant winding strand prior to commutation is therefore not transformed into heat or buffered in a capacitor, but is used directly to produce torque. This procedure, in which the magnetic energy stored in the strand that is to be switched off is converted directly into mechanical energy, constitutes part of the commutation procedure, as a kind of "prelude" to the actual act of switching over current from one winding strand to the other.

It is particularly advantageous in this context if the recovery circuit, through which the current of the winding strand to be switched off flows, is not interrupted until the energy stored in the relevant stator winding has dissipated and said stator winding is therefore approximately or entirely currentless. Controlling the semiconductor switch that is arranged in the supply lead to the parallel circuit can thus enable currentless, low-loss commutation, and this enables higher efficiency but also the use of smaller components and higher power densities.

Another manner of achieving the stated object results from an electronically commutated motor in which each winding strand and its associated semiconductor switch together form a series circuit, the series circuits collectively form a parallel circuit, and the extra or additional semiconductor switch, located in the supply lead from the power source, is used to interrupt power supply at a favorable instant (t64) associated with each commutation. An approach of this kind enables a compact design for such a motor, and good efficiency.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION

Figure 1:
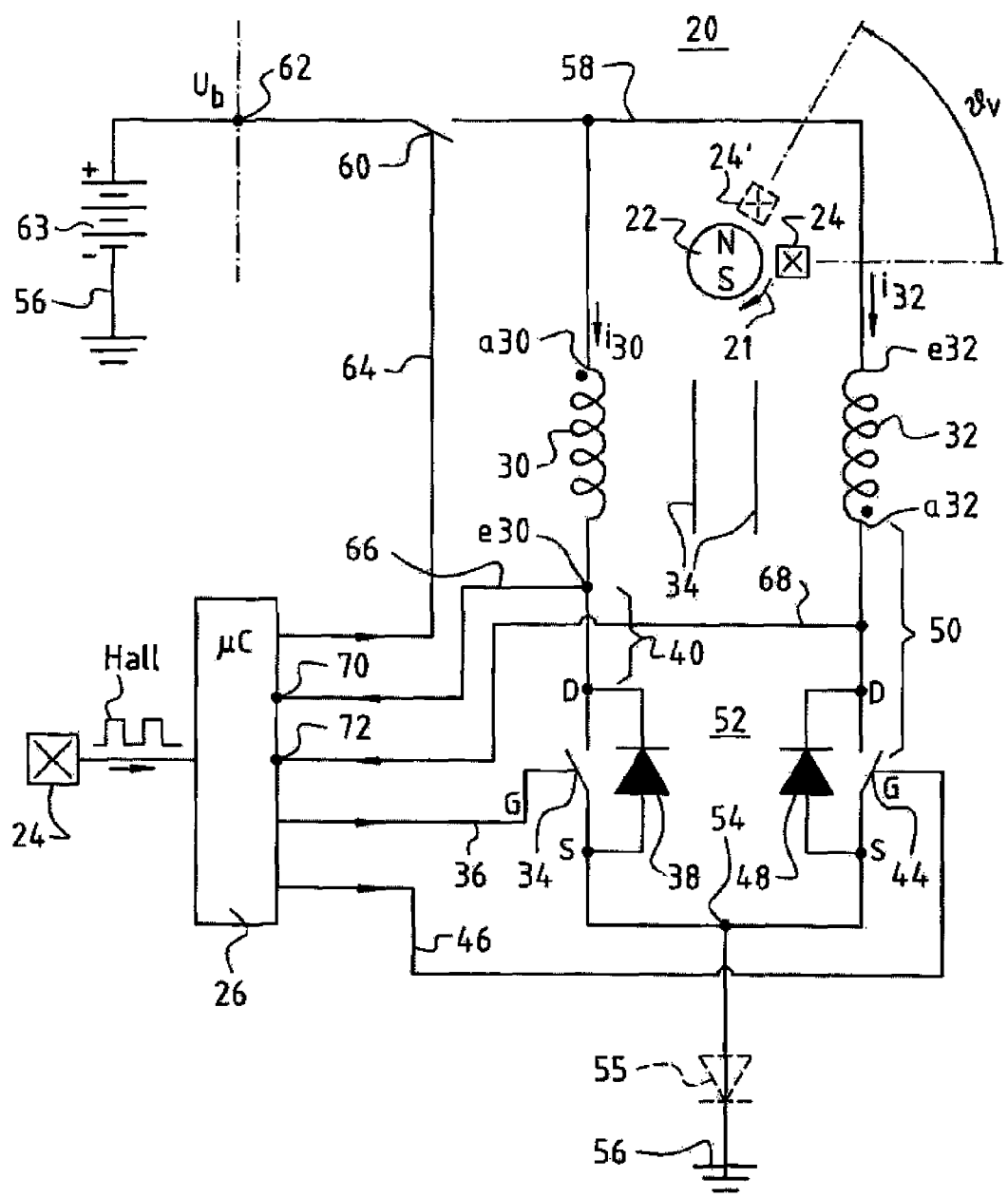
FIG. 1 is an overview circuit diagram of a preferred embodiment of a motor according to the invention.

FIG. 1 is a schematic depiction of a motor 20 according to a preferred embodiment of the invention. It has a permanent-magnet rotor 22 (indicated only schematically), whose rotation direction is designated 21 in order to depict graphically the offset of a Hall sensor 24 oppositely to the rotation direction. Rotor 22 is depicted as having two poles, but it can also have four, six, etc. poles; and it can be, for example, an internal rotor, an external rotor, or the rotor of a motor having a flat or conical air gap.

This rotor 22 controls Hall sensor 24, which is also depicted to the left in FIG. 1 and generates, in operation, a "Hall" signal that is depicted schematically in FIG. 1 and is supplied to a microcontroller µC 26 that is associated with motor 20 and is usually built into it. The provision of current to µC 26 at a regulated voltage of, for example, 5 V is not depicted, since it is known to one skilled in the art. µCs of this kind are used in very large numbers in electronically commutated motors (ECMs) in order to control their functions, e.g. commutation, rotation speed regulation, motor current limiting, etc. In the variant according to FIG. 16, an ASIC (Application Specific Integrated Circuit) can also be used for component 26, if applicable, instead of a µC.

Motor 20 has two stator winding strands 30, 32 that are magnetically coupled, as indicated by a symbol 34. Winding strands 30, 32 are usually wound with two parallel wires, this being referred to as "bifilar winding." In operation, current flows in opposite directions through the two wires that each constitute a winding strand, so that they generate magnetic poles of opposite polarity. With this type of winding, the winding direction is usually indicated by a dot at the beginning of the corresponding winding. The terminals of strands 30, 32 are labeled as follows:

| Winding strand 30 | |
| --- | --- |
| with dot: | a30 |
| without dot: | e30 |
| Winding strand 32 | |
| with dot: | a32 |
| without dot: | e32. |

Connected in series with first winding strand 30 is a first controllable semiconductor switch 34, which is indicated only symbolically in FIG. 1 and is controlled by µC 26 via a control lead 36. A recovery diode 38 is connected antiparallel to semiconductor switch 34. First winding strand 30 forms, together with first semiconductor switch 34 and diode 38, a first series circuit 40 that of course may contain further elements.

Connected in series with second winding strand 32 is a second controllable semiconductor switch 44 that once again is only symbolically indicated and is controlled by µC 26 via a control lead 46. A recovery diode 48 is connected antiparallel to semiconductor switch 44. Second winding strand 32 forms, together with second semiconductor switch 44 and diode 48, a second series circuit 50 that of course may contain further elements.

As FIG. 1 shows, the two series circuits 40, 50 are connected in parallel to form a parallel circuit 52 whose base point 54 is connected, optionally via a diode 55, to ground 56, said circuit being connected, at the upper end in FIG. 1, to a DC link circuit 58. As depicted, terminals a30 and e32 of the two winding strands 30, 32 are connected to this link circuit, i.e. when semiconductor switch 34 conducts, a current i30 flows from terminal a30 to terminal e30 through first strand 30; and when semiconductor switch 44 conducts, a current i32 flows from terminal e32 to terminal a32 of strand 32. This statement must be modified for the time periods shortly before a commutation, however, as explained below.

DC link circuit 58 is connected via a third semiconductor switch 60 to a motor terminal 62 to which, in operation, a positive voltage Ub of, for example, 12, 24, 48, or 60 V is applied with respect to ground 56. A DC power source 63 of arbitrary type is depicted symbolically in order to facilitate comprehension. Third semiconductor switch 60 is likewise controlled by μC 26 via a control lead 64.

μC 26 has a potential supplied to it from terminal e30 via a sensor lead 66, and a potential supplied to it from terminal a32 via a sensor lead 68. When the relevant strand 30 or 32 is currentless, voltages occur at these terminals; these voltages are induced in these strands by permanent-magnet rotor 22 and can be processed in μC 26 in order to define the beginning of the commutation procedures at points in time at which motor 20 operates favorably.

This means that a) the motor is being effectively utilized, i.e. that current pulses i30, i32 do not become too short;

b) motor 20 is working in a region with good efficiency, i.e. that the electrical energy supplied to motor 20 at terminal 62 is converted into a high percentage of mechanical energy and the lowest possible percentage of thermal energy; and c) the reactive power generated by motor 20 is low, so that only a small capacitor, or none at all, is necessary for the DC link circuit. A link circuit capacitor 110 of this kind is shown by way of example in FIG. 12.

The manner of operation is explained below. It requires a skillful interplay in the control of the three semiconductor switches 34, 44, and 60. A diode 61 is connected antiparallel with MOSFET 60.

Figure 2:
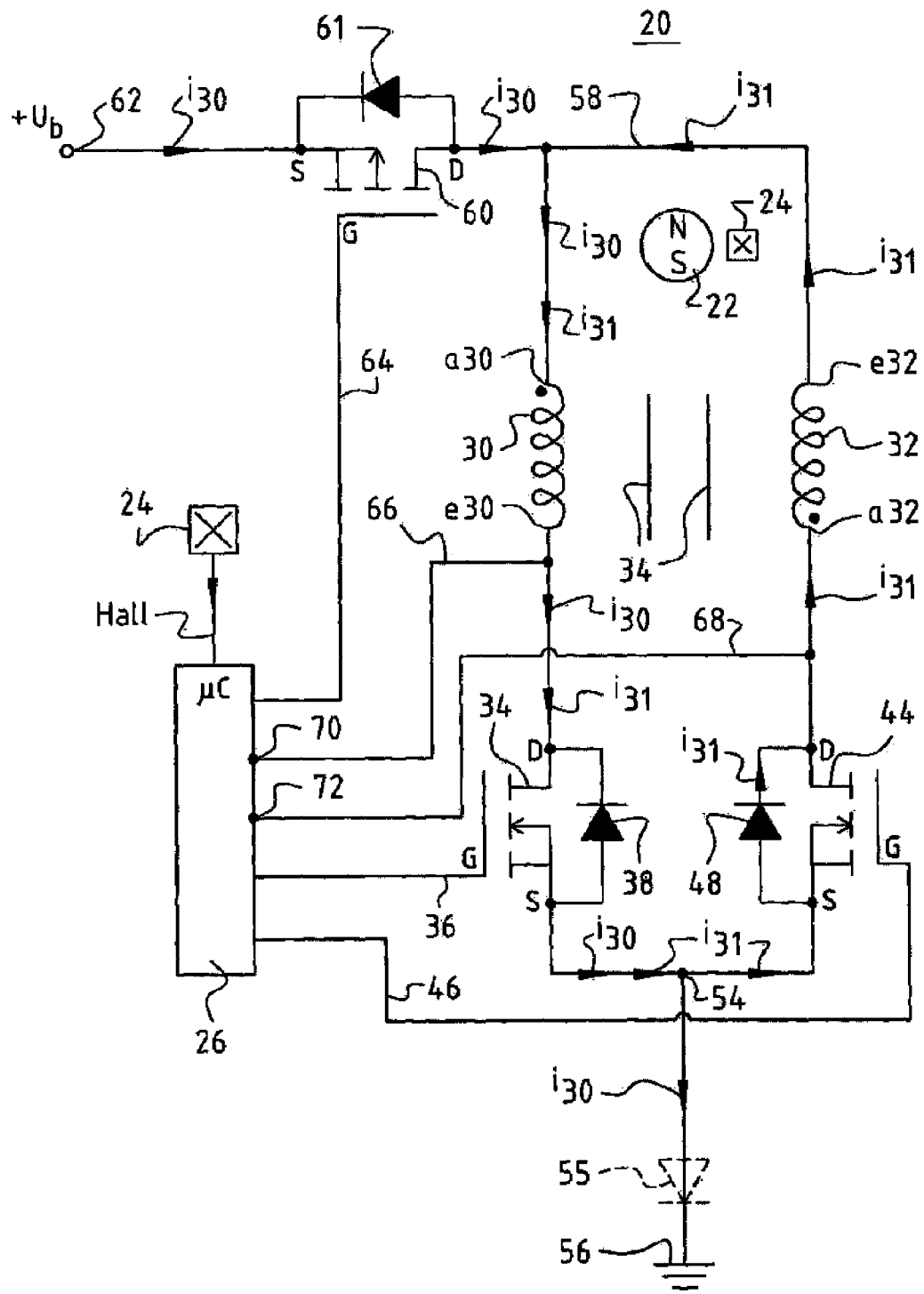
FIG. 2 is analogous to FIG. 1, explicitly depicting the semiconductor switches and the currents for the left winding strand 30 in order to facilitate comprehension of the invention.

In FIG. 2, semiconductor switches 34, 44 are depicted as n-channel MOSFETs, and switch 60 as a p-channel MOSFET (Metal Oxide Semiconductor Field Effect Transistor). The same designations as in FIG. 1 are used.

The source S of the two MOSFETs 34 and 44 is connected to node 54. Drain D of transistor 34 is connected to terminal e30, and drain D of transistor 44 to terminal a32.

Drain D of transistor 60 is connected to DC link circuit 58, and its source S to terminal 62. Gates G are controlled, in the manner depicted, by μC 26.

Operation of FIG. 2

Reference is made, for this purpose, to FIGS. 2 to 5. Shortly before instant tK1 of FIG. 4, all three transistors 34, 44, and 60 in FIG. 2 are blocked, and motor 20 consequently receives no energy from terminal 62, i.e. energy supply from outside is blocked.

At instant tK1, transistors 34 and 60 are switched on by μC 26 so that from terminal 62, a current i30 flows through transistor 60, link circuit 58, winding strand 30, transistor 34, and if applicable a diode 55 (if present), to ground 56. The shape of this current i30 is evident from FIG. 4, and it is approximately complementary in profile to the so-called induced voltage that rotor 22 induces, as it rotates, in strands 30 and 32. This voltage is also referred to as "back EMF," since it acts oppositely to voltage Ub that is applied to terminal 62.

Figure 4:
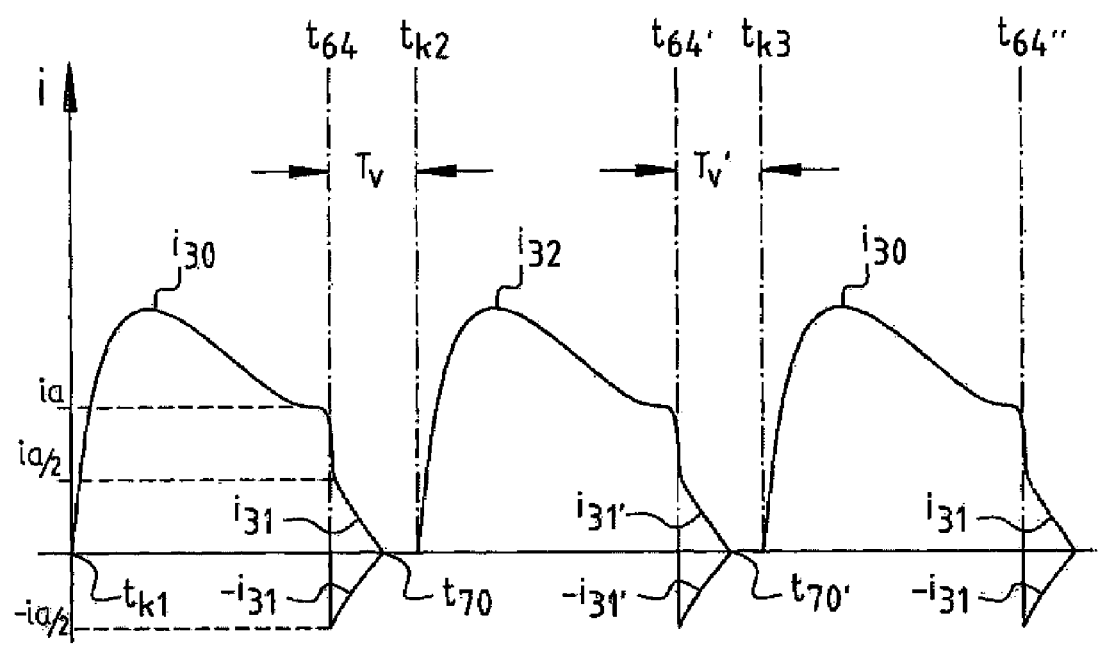
FIG. 4 depicts the currents that flow in stator strands 30, 32 in operation.

Commutation instant tK1 is followed by further commutation instants tK2, tK3, etc., as depicted in FIG. 4.

The subsequent commutation instant tK2 can be precalculated rather exactly from the instantaneous rotation speed of rotor 22. Located at a predetermined time interval Tv before tK2 is an instant t64, the determination of which by calculation is explained below; at this instant t64, transistor 60 is blocked so that the supply of current i30 from terminal 62 is interrupted, i.e. no energy is supplied to motor 20 from DC power source 63 during time period Tv.

Shortly before instant t64, a current ia (cf. FIG. 4) flows in winding strand 30, so that an energy, that can be calculated according to formula (1) (provided the inductance L of strand 30 is known), is stored in strand 30.

The effect of this stored energy is that a circulating current i31 now flows through first strand 30, since transistor 34 is still conductive. This circulating current i31 therefore flows from terminal e30 through transistor 34, node 54, and recovery diode 48 to terminal a32, through second strand 32 and link circuit 58 to terminal a30, and through first strand 30 back to terminal e30.

Current i31 thus flows through both strands 30 and 32, but (in FIG. 2) from top to bottom through strand 30, and from bottom to top through strand 32.

Figure 5:
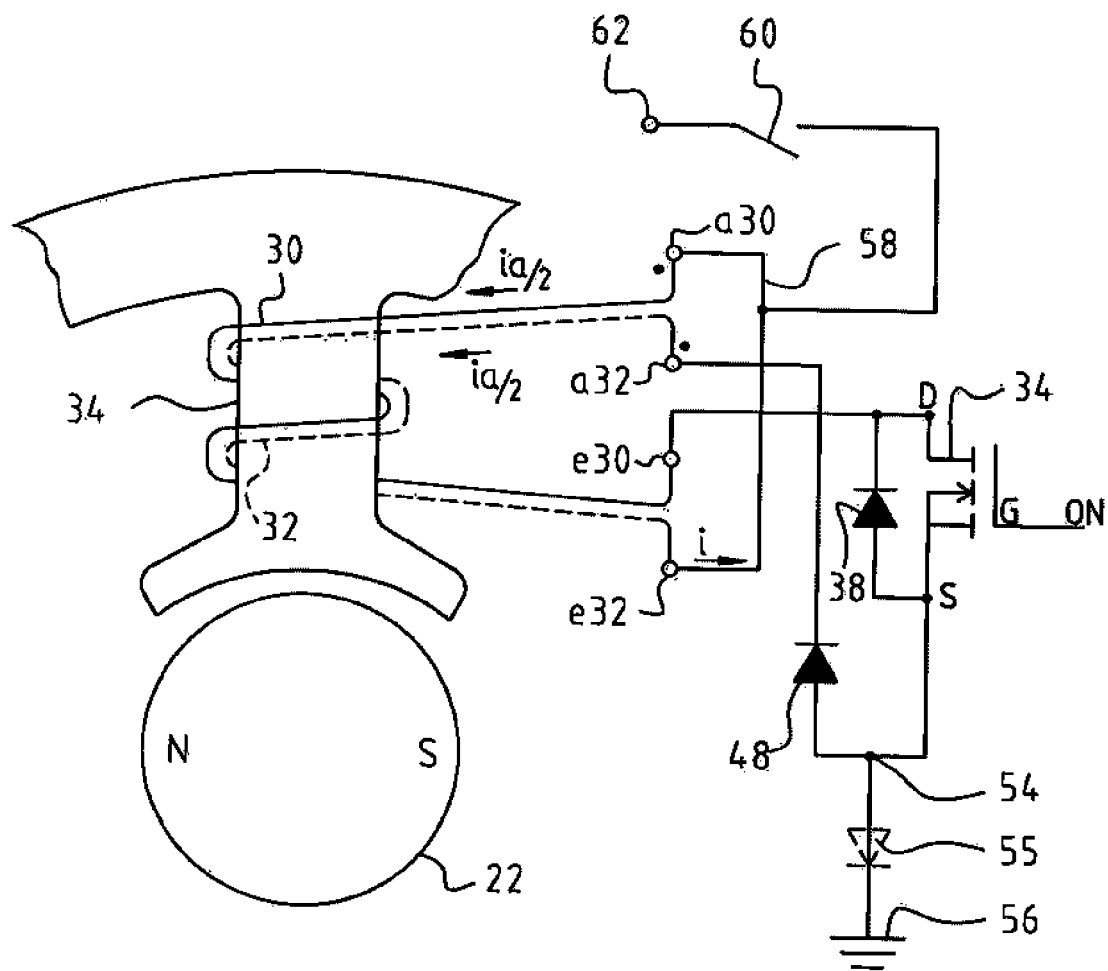
FIG. 5 is analogous to FIG. 2 and serves for better comprehension of abrupt changes in the currents flowing in the stator winding.

This is depicted somewhat more graphically in FIG. 5. FIG. 5 shows current ia/2 at instant t64 at which transistor 60 is switched off. Current ia/2 now flows through each of the two strands 30, 32, and the effects of these currents add up to the same effect exhibited by the entire current ia that flowed only through first strand 30 shortly before instant t64. Efficiency is improved because in this state, the copper cross section is doubled.

The effect is therefore that at instant t64, the current in strand 30 becomes approximately 50% lower, and in compensation, current i31 in strand 32 jumps from zero to the value ia/2.

The driving current can thus continue to flow in stator windings 30 and 32 after transistor 60 is opened, so that the magnetic energy stored in strand 30 is converted into kinetic energy and continues to drive rotor 22.

Current i31 drops relatively rapidly, and reaches a value of zero at an instant t70 (FIG. 4). Transistor 34 can therefore become blocked as of t70, since current i31 has become zero.

Instant t70 is located in time shortly before the subsequent commutation instant tK2 (cf. FIG. 4), so that at instant tK2 a normal commutation is possible and is performed.

Figure 3:
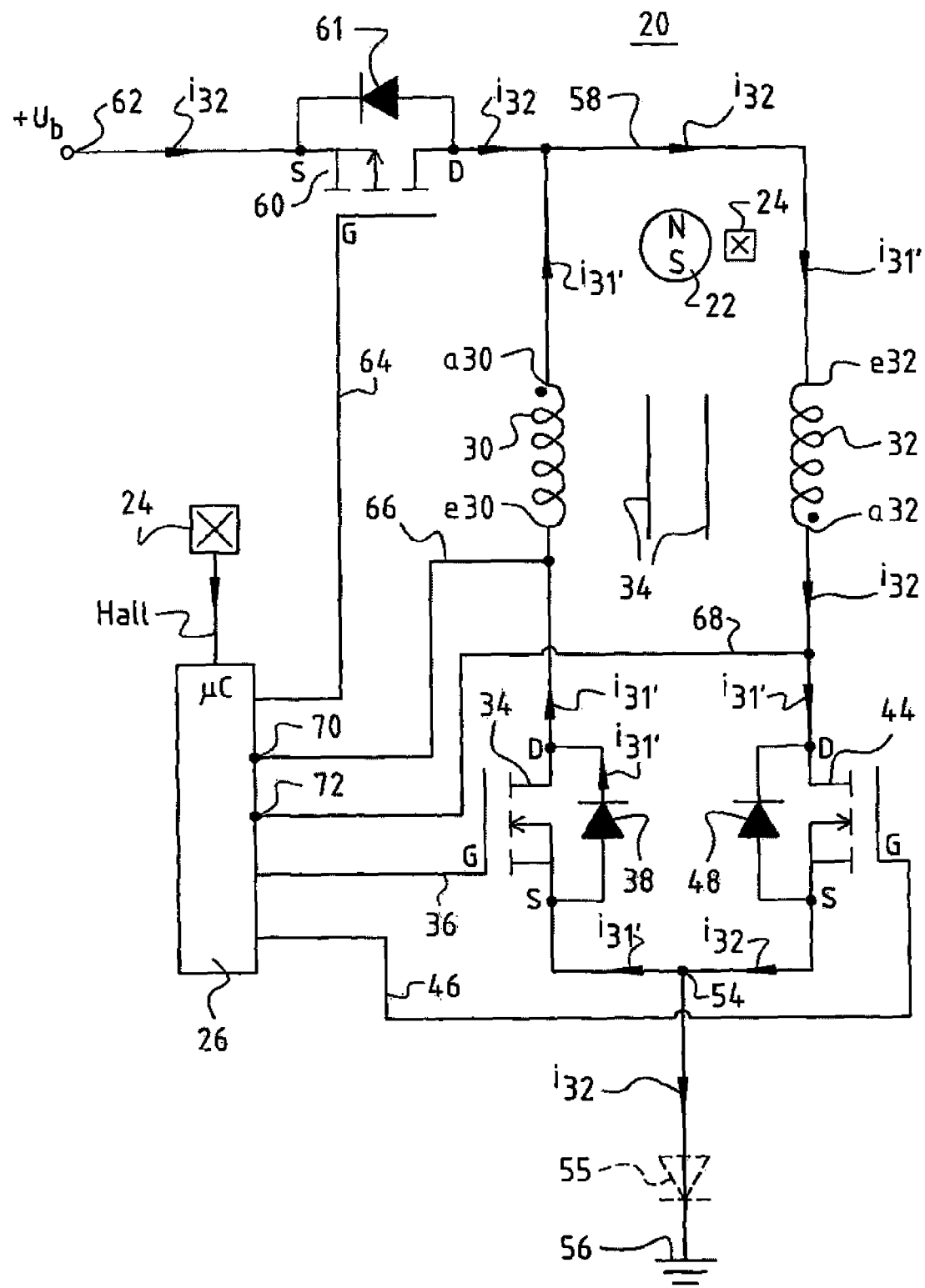
FIG. 3 is analogous to FIG. 2, explicitly depicting the currents for the right winding strand 32 in order to facilitate comprehension of the invention.

FIG. 3 shows the state when transistor 34 is blocked and transistor 44 is switched on and then blocked.

Operation of FIG. 3

Reference is made here to FIGS. 3 and 4. Shortly before instant tK2 of FIG. 4, all three transistors 34, 44, and 60 in FIG. 3 are blocked, and motor 20 consequently receives no energy from terminal 62, i.e. energy supply from outside is blocked.

At instant tK2, transistors 44 and 60 are switched on by μC 26 so that a current i32 flows from terminal 62 through transistor 60, link circuit 58, winding strand 32, transistor 44, and if applicable diode 55, to ground 56. The shape of this current i32 is evident from FIG. 4.

Commutation instant tK2 is followed by commutation instant tK3. Located at a predetermined time interval Tv' before tK3 is an instant t64', the determination of which by calculation is explained below; at this instant t64', transistor 60 is blocked so that the supply of current i32 from terminal 62 is interrupted, i.e. no energy is supplied to motor 20 from terminal 62 during time period Tv'.

Shortly before instant t64', a current i32=ia flows in winding strand 32 (cf. FIG. 4 and FIG. 5), so that an energy that can be calculated according to formula (1) (provided the inductance L of strand 32 is known) is stored in strand 32. (This energy is normally of the same magnitude as the inductance of strand 30.)

The effect of this stored energy is that a circulating current i31' now flows through the two strands 30 and 32, since transistor 44 is still conductive. This circulating current i31' corresponds to circulating current i31 in FIG. 2 but flows in the opposite direction, namely from terminal a32 through transistor 44, node 54, and recovery diode 38 to terminal e30, through first strand 30 and link circuit 58 to terminal e32, and through second strand 32 back to terminal a32.

Current i31' thus flows through both strands 30 and 32, but (in FIG. 3) from top to bottom through strand 32, and from bottom to top through strand 30.

As described previously with reference to FIG. 5, the effect is that the current in strand 32 becomes 50% lower at instant t64', and that current i31' in strand 30 instead rises from zero to that same 50%-lower value, ohmic losses being reduced because the copper cross section is doubled.

The driving current can thus continue to flow in stator windings 30 and 32 after transistor 60 is blocked, so that the magnetic energy stored in strand 32 is converted into kinetic energy and continues to drive rotor 22.

The level of current i31' drops relatively rapidly, and reaches a value of zero at an instant t70' (FIG. 4). Transistor 34 can therefore be blocked without loss starting at t70, since current i31' has become zero. This allows the use of economical, lower-performance components.

Instant t70' is located in time shortly before the subsequent commutation instant tK3 (cf. FIG. 4), so that at instant tK3 a normal commutation is possible and is performed.

What is achieved by the invention is therefore that in operation, i.e. after motor 20 has accelerated to its operating speed, the stored magnetic energy of the strand to be switched off in a two-strand, two-pulse motor 20 is converted by "current loops" (current i31 in FIG. 2 or i31' in FIG. 3) into drive energy for rotor 22. Unlike with two-strand, two-pulse motors of the existing art, the majority of this energy is therefore not transformed into heat or buffered as electrical energy in a link circuit capacitor, so that efficiency is improved and only a relatively small link circuit capacitor is required, which is usually smaller than in motors according to the existing art.

When the magnetic energy is transformed into mechanical energy, strand 32 in FIG. 3 no longer carries current. This is the case at instant t70' in FIG. 4. When rotor 20 then reaches instant t70' of FIG. 4, transistor 44 can be switched off in loss-free fashion, and transistor 34 can then be switched on in loss-free fashion at instant tK3; and higher-order transistor 60 can be switched on again in order to supply energy from outside, e.g. from voltage source 63, to motor 20.

The processes according to FIG. 2 and FIG. 3 therefore constantly alternate in operation.

Figure 6:
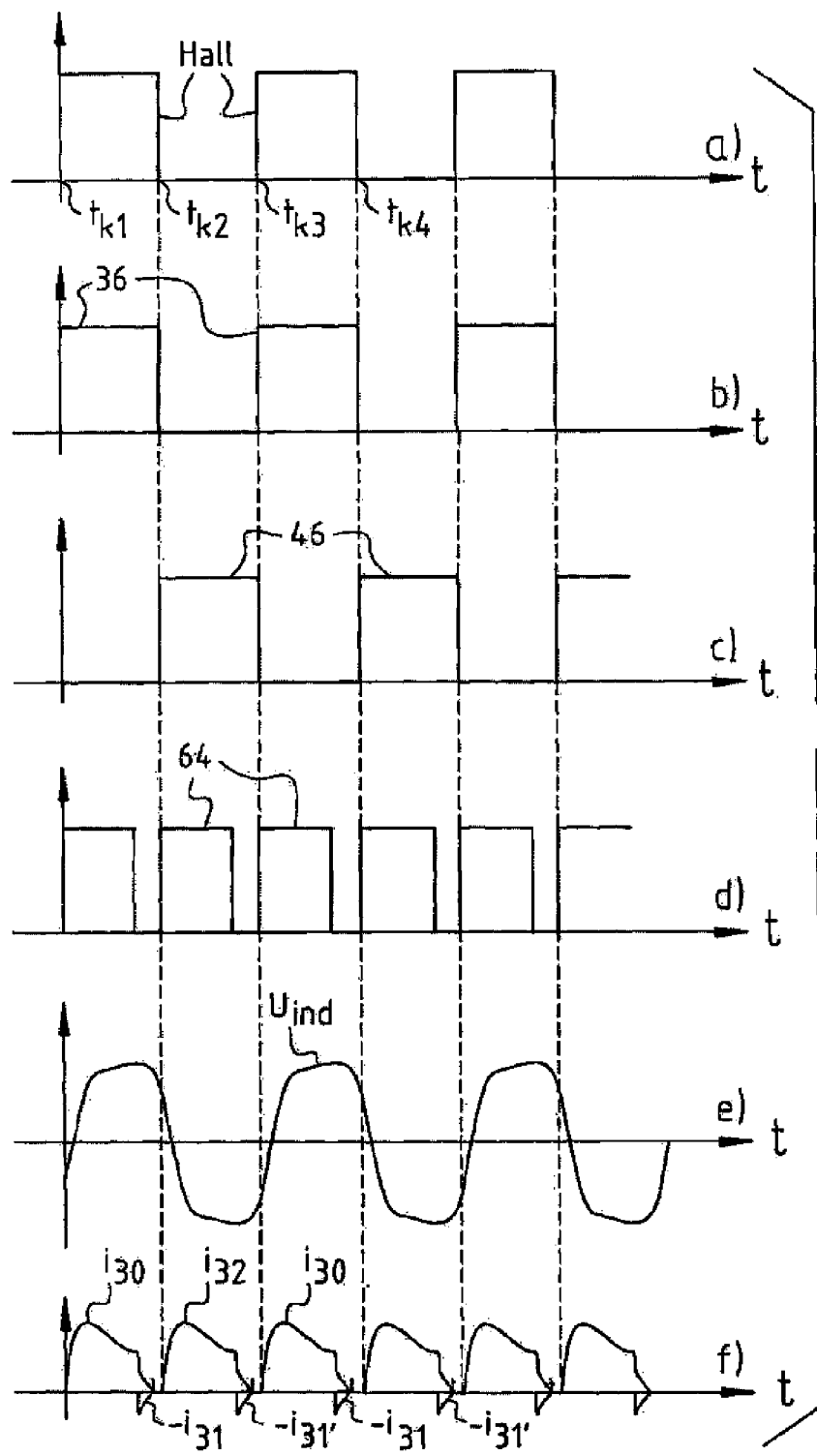
FIG. 6 depicts various voltages and currents that occur in operation in the motor according to FIGS. 1 to 5.

The actual switchover (commutation) between transistors 34 and 44 or vice versa is produced by the Hall signal from Hall sensor 24, as depicted in FIG. 6. Hall sensor 34 is advantageously displaced a few degrees in the advance direction, e.g. approximately 4° el., in order to achieve so-called "time-advanced ignition." Alternatively, this can also be achieved by electronically displacing the Hall signal in terms of its phase position, as is known to the skilled artisan.

FIG. 6a) shows the Hall signal, from which a numerical value for the rotation speed, e.g. the time required for rotor 22 to make half a revolution (or, better, one complete revolution) can easily be obtained.

FIG. 6b) shows the signal on control lead 36 to transistor 34, and

FIG. 6c) shows the signal on control lead 46 to transistor 44.

FIG. 6d) shows the signal on control lead 64 to higher-order transistor 60. It is evident that the latter is already blocked while transistor 34 or transistor 44 is still conductive.

FIG. 6e) shows the induced voltage on one of strands 30 or 32.

FIG. 6f) shows current i30, i31, i32 in strands 30 and 32. These currents have been described in detail with reference to FIG. 4.

To ensure that the energy stored in a strand 30 or 32 is dissipated in timely fashion prior to instant tK1, tK2, etc., i.e. by the time the Hall signal changes, the voltage induced by the rotating rotor 22 is detected by μC 26 in the switched-off winding strand at drain terminal D of the relevant transistor 34 or 44. This is because the drain potential is approximately at ground during the period in which a circulating current is flowing in strands 30, 32.

Once the circulating current has become zero, the induced voltage can be measured and the time period Tv required for dissipation of the magnetic energy in the relevant strand can be ascertained. What can thereby be achieved is that higher-order transistor 60 is always blocked only early enough that the energy due to circulating currents in the strand to be switched off has dissipated, at the latest, at instant tK1, tK2, etc. μC 26 can also sense when higher-order switch 60 has been blocked too late. If current is therefore still flowing in strands 30, 32 at instant tK1, tK2, the induced voltage then cannot be sensed. Currentless commutation is not possible in this case, and higher-order switch 60 is therefore opened correspondingly earlier at the next commutation procedure in order to avoid continuously overloading transistors 34, 44. A corresponding routine is explained below with reference to FIG. 11.

As described, the induced voltage Uind (depicted by way of example in FIG. 6e)) generated by the rotation of rotor 22 is sensed at the drain terminal of transistor 34 or 44 that is blocked at that moment. The induced voltage becomes smaller as the commutation instant tK1, tK2 approaches. This complicates sensing of the voltage, especially if, in the interest of optimum utilization of the winding, dissipation of the stored magnetic energy needs to be delayed as much as possible in the direction of the commutation instant. As already explained, this can be improved by mechanically displacing Hall sensor 24 in the advance direction, so that an ignition advance is obtained and the generated induced voltage becomes greater at the moment it is detected.

The induced voltage Uind is readily detectable even at low rotation speeds. This is apparent from FIG. 8, which is an equivalent circuit diagram of the motor. Here the voltage sources Uind30 and Uind32 of the two winding strands are connected in series, so that with appropriate wiring, double the voltage can be detected.

Figure 7:
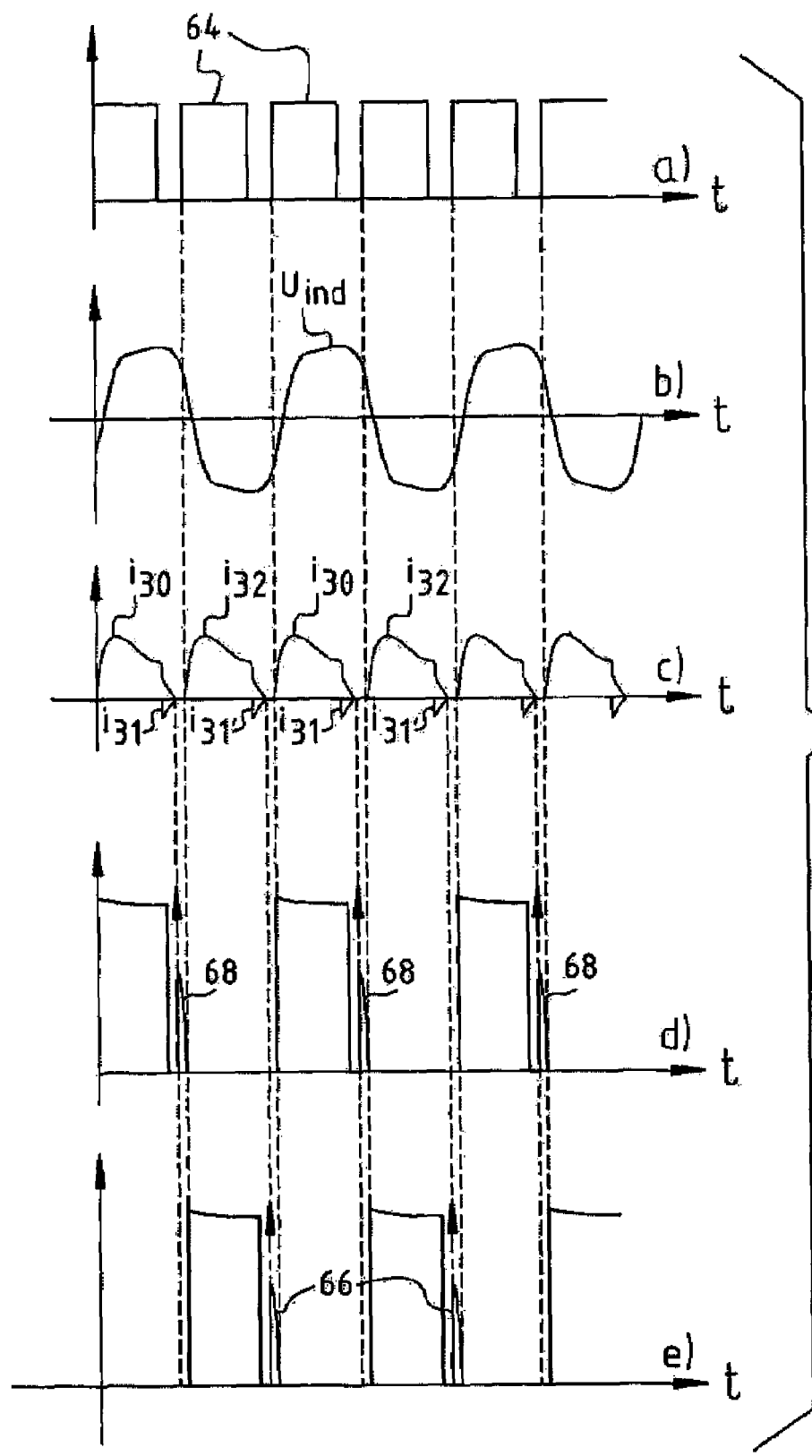
FIG. 7 is analogous to FIG. 5 and shows signals 66, 68 that can be measured in a motor according to FIG. 2 when the current in the strands has reached a value of zero (before a commutation)
Figure 15:
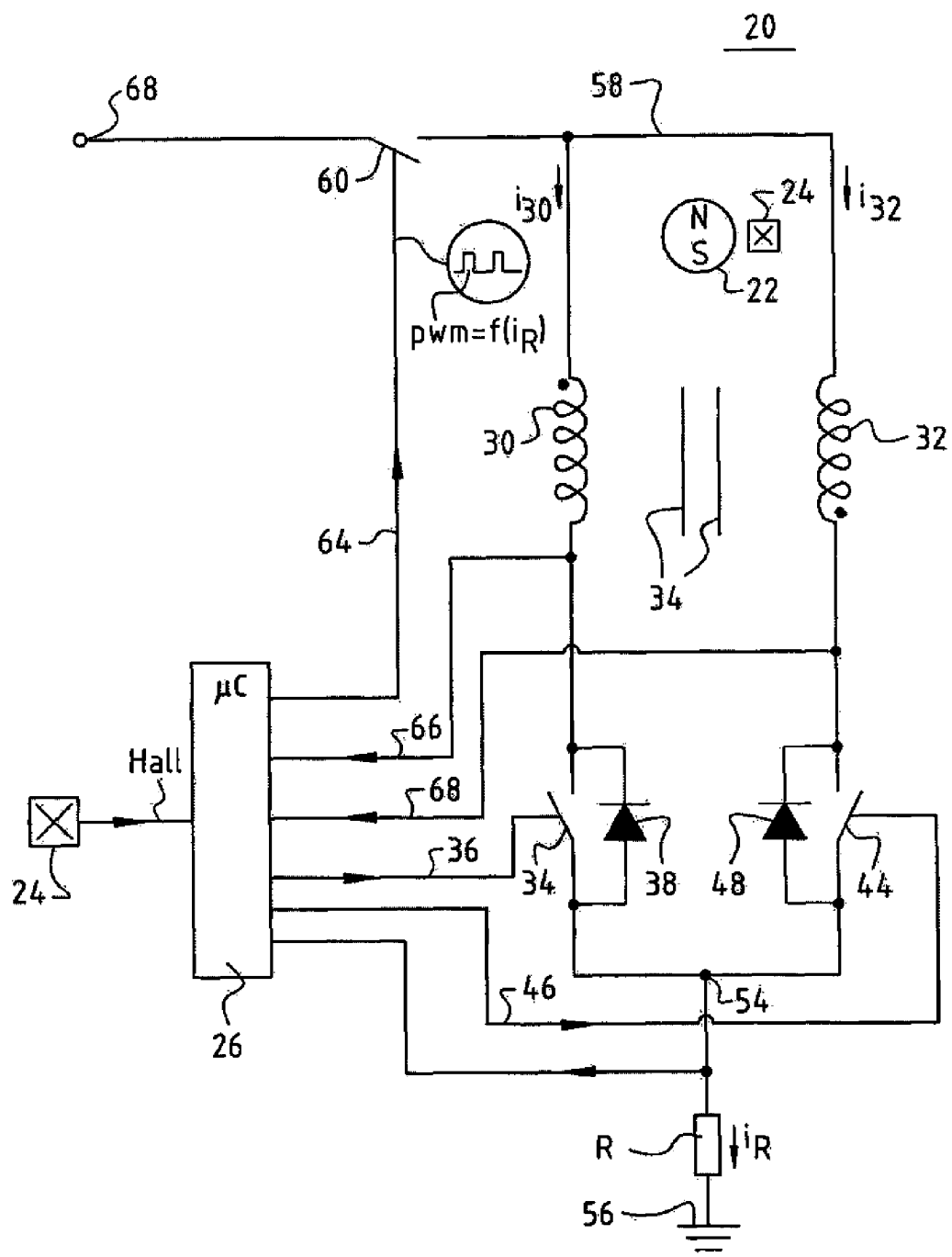
FIG. 15 is a circuit diagram showing possibilities for low-loss limiting of the motor current.

FIG. 7 shows, at a), the signal on lead 64, with which signal higher-order transistor 60 is controlled. For current limiting, this signal can take the form of a PWM signal, as depicted in FIG. 15.

FIG. 7b) shows the induced voltage induced by permanent-magnet rotor 22 in one of strands 30, 32.

FIG. 7c) shows currents i30, i31, i31', i32 that were explained in further detail with reference to FIG. 4.

FIG. 7d) shows the portions of the induced voltage at the currentless strand 32 that are supplied via lead 68 to μC 26 and evaluated thereby. The occurrence of these pulses indicates that circulating current i31 (or i31') in strands 30 and 32 has decayed to zero, so that currentless commutation at instants tK1, tK2, etc. is possible, as explained with reference to FIG. 4.

FIG. 7e) shows, analogously, the portions of the induced voltage at the currentless strand 30 that are supplied via lead 66 to µC 26 and evaluated thereby. The statements made with respect to FIG. 7d) apply analogously to these portions.

Figure 8:
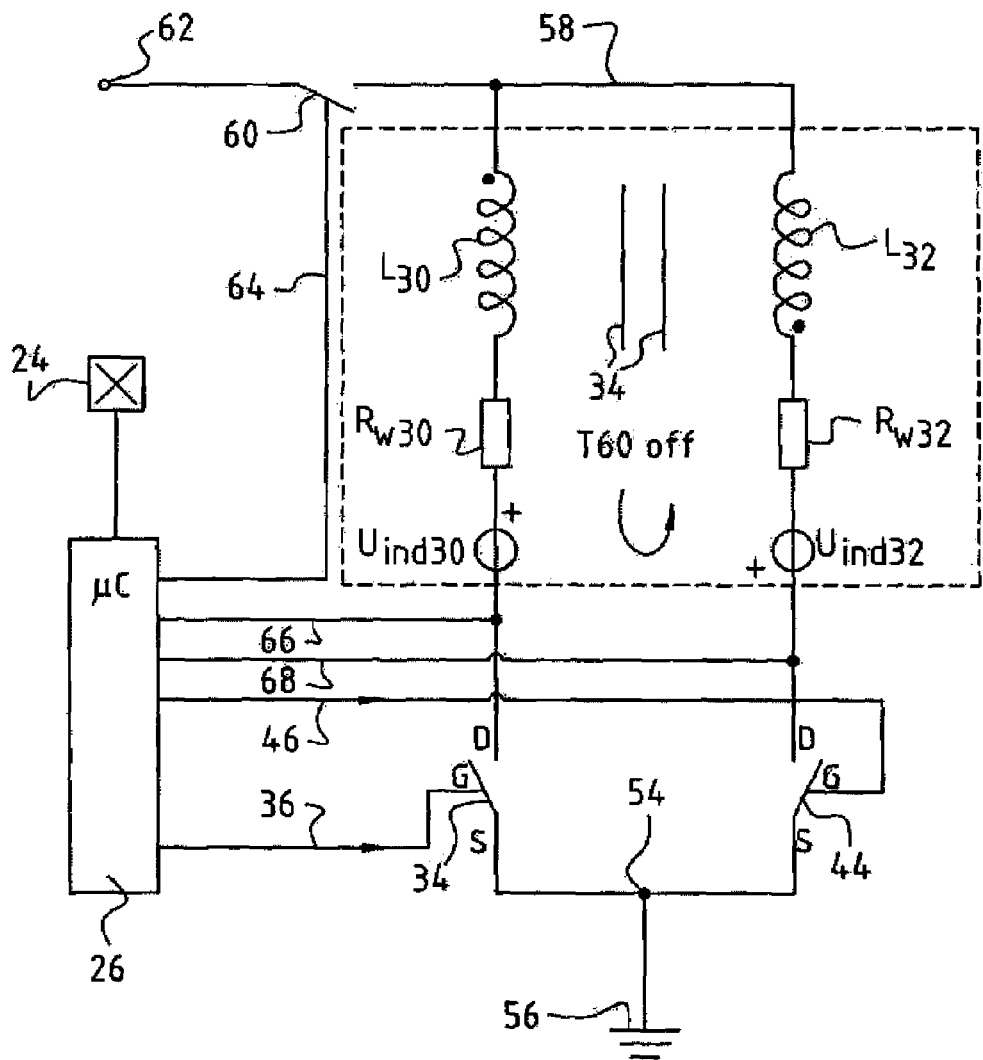
FIG. 8 depicts an equivalent circuit diagram for the two stator winding strands; the rotor is not shown.

FIG. 8 is an equivalent circuit diagram of strands 30 and 32. Each strand has respectively an inductance L30 and L32, an ohmic resistance Rw30 and Rw32, and lastly (in operation) an induced voltage Uind30 and Uind32. Because these voltages are connected in series, twice the voltage Uind can be detected, if applicable. In the interest of better sensing of the induced voltage, it is useful to mechanically displace Hall sensor 24 slightly in the ignition advance direction, i.e. oppositely to the rotation direction, since voltage pulses 66, 68 then have a higher amplitude.

If sufficient I/O inputs for signal input are present on µC 26, drain terminals D of the two transistors 34, 44 can be connected individually to an associated I/O terminal 70, 72, respectively, of µC 26 (cf. FIGS. 1 and 2).

Figure 9:
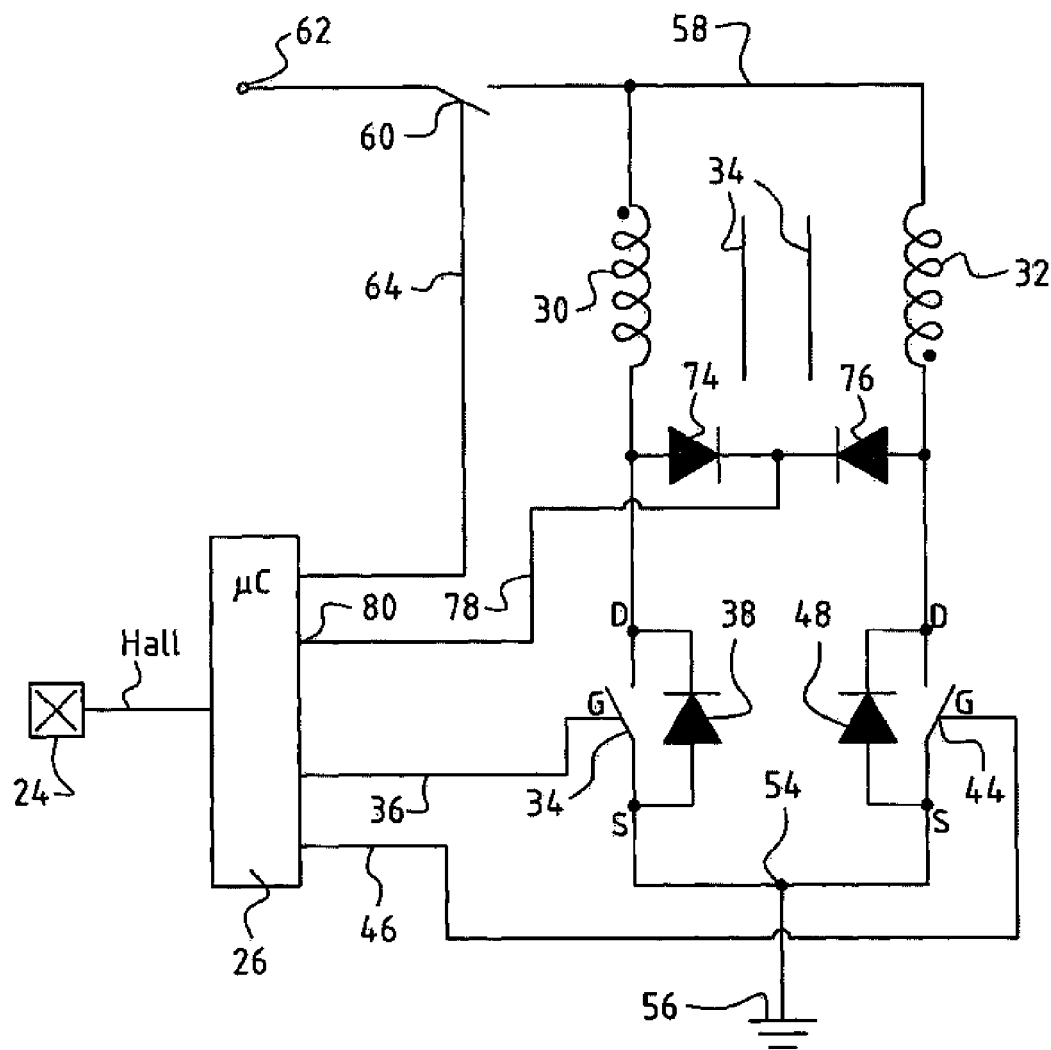
FIGS. 9 and 10 depict variant circuits that are useful chiefly when an economical µC 26 is to be used.
Figure 10:
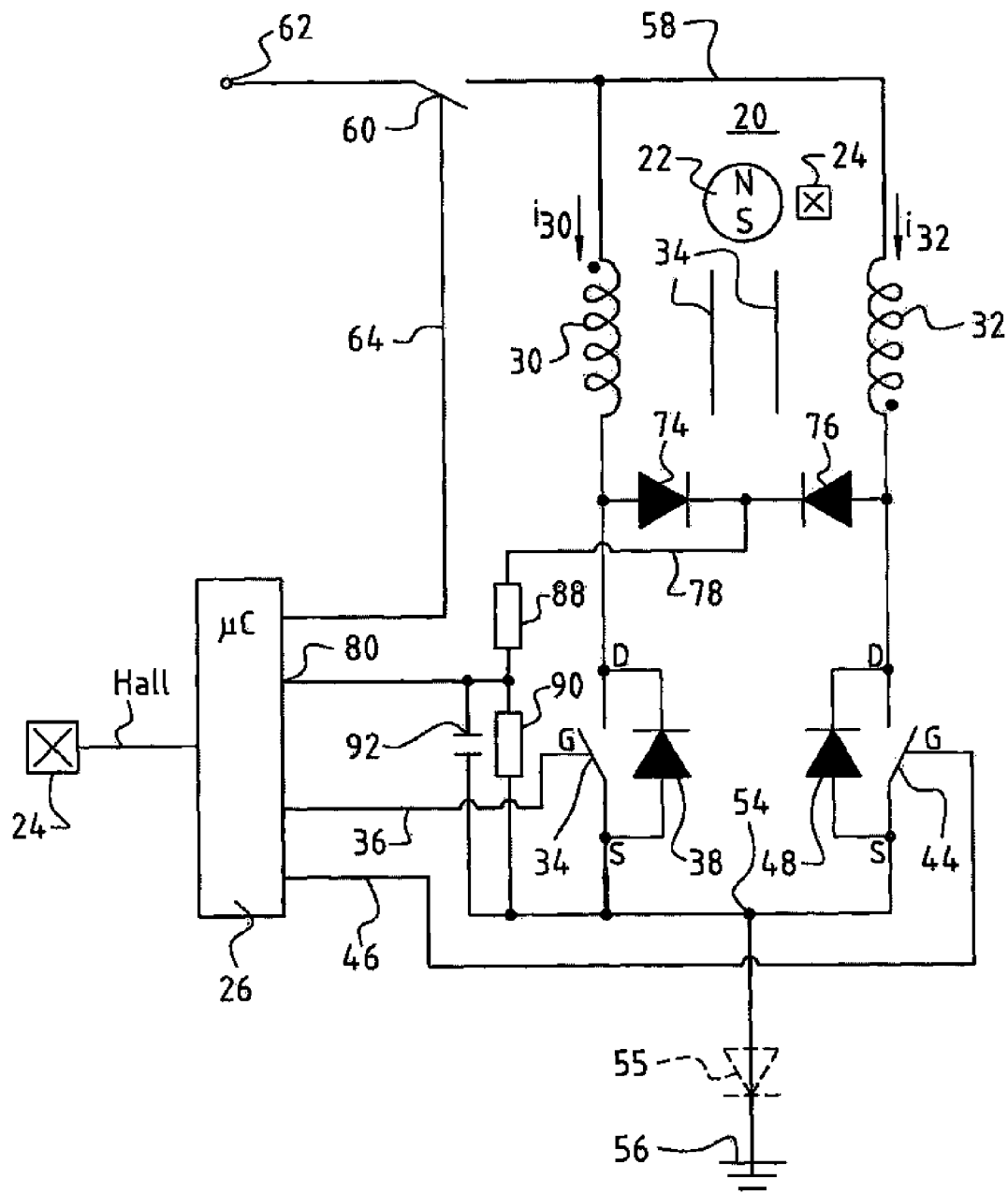

If only a few I/O terminals are available, drain terminals D can be decoupled using two diodes 74, 76, as shown in FIG. 9 and FIG. 10, and connected via a lead 78 to a single I/O terminal 80 of µC 26.

Another, preferred possibility is shown in FIG. 10. This circuit represents an improvement of the circuit according to FIG. 9, and identical reference characters are used for identical elements in the two Figures.

Terminal 78 at the cathodes of the two diodes 74, 76 is connected via a resistor 88 to I/O terminal 80 of µC 26, and the latter is in turn connected via a resistor 90 to node 54. A capacitor 92 can be provided parallel to resistor 90 in order to suppress oscillations.

Preferred Values

| µC26 | PIC12F629 (Microchip) |
|---|---|
| R88 | 100 kilohm |
| R90 | 300 kilohm |
| C92 | 100 pF |

When transistor 60 is blocked, in FIG. 2 a circulating current i31 flows counterclockwise, and in FIG. 3 a circulating current i31' flows clockwise. It must be possible to determine when this circulating current i31 or i31' has reached a value of zero, since currentless commutation can then take place.

Because transistor 60 is blocked, i.e. no current is being supplied from current source 63 (FIG. 1), a current i31 or i31' circulates. As long as this is the case, the drains D of both MOSFETs 34 and 44 are LOW.

The direction of this current circulation depends on whether strand 30 or strand 32 was carrying current. If strand 30 was carrying current (FIG. 2), the current circulates counterclockwise. The potentials at the drains of transistors 34, 44 become zero, which can be sensed at input 80 of µC 26.

When the circulating current has become zero, in this case the drain of transistor 44 (i.e. on the right) becomes positive because of the voltage induced in the stator strands by the rotating permanent-magnet rotor 22.

This is transferred via diode 76 and resistor 88 to I/O input 80 of µC 26. Resistor 88 prevents this input from being overdriven if the induced voltage at the right-hand drain becomes too high. This therefore applies to the HIGH state at input 80.

Resistor 90, conversely, serves to generate a reliable LOW as long as a circulating current is flowing.

Capacitor 92 is optional in case oscillations occur.

If transistor 44 was conductive, the induced voltage at the drain of transistor 34 is measured.

For the voltage measurement, a µC 26 having an A/D (Analog-to-Digital) input for this purpose would be most advantageous, but such µCs are expensive.

As compared therewith, it is cheaper to use an input having a comparator.

Lastly, the cheapest version, and the one shown in FIG. 10, is the one having a standard I/O input 80.

When TTL logic is used, an input of this kind has, for example, the following values:

LOW:<0.8 V
HIGH:>=2.4 V.

An I/O input of this kind is clamped with an internal protective diode (not depicted) in order to protect it from overvoltage. This diode must not be overloaded, and high-impedance resistor 88 is therefore used to limit the current through this clamping diode.

The function of resistor 90 is to pull the potential at input 80 farther down in a LOW context, i.e. as long as a circulating current is flowing, in other words to generate a reliable LOW signal.

A HIGH is detected at input 80 when
a) circulating current i31 or i31' has dropped to zero, and
b) the MOSFET on the relevant side is nonconductive, and on the opposite side is conductive, since when the MOSFET there is conductive, it pulls the potential at its drain down to ground potential.

It is possible in this fashion to determine exactly when circulating current i31 or i31' has stopped circulating, so that commutation can occur and MOSFET 60 can be switched on correctly.

Figure 11:
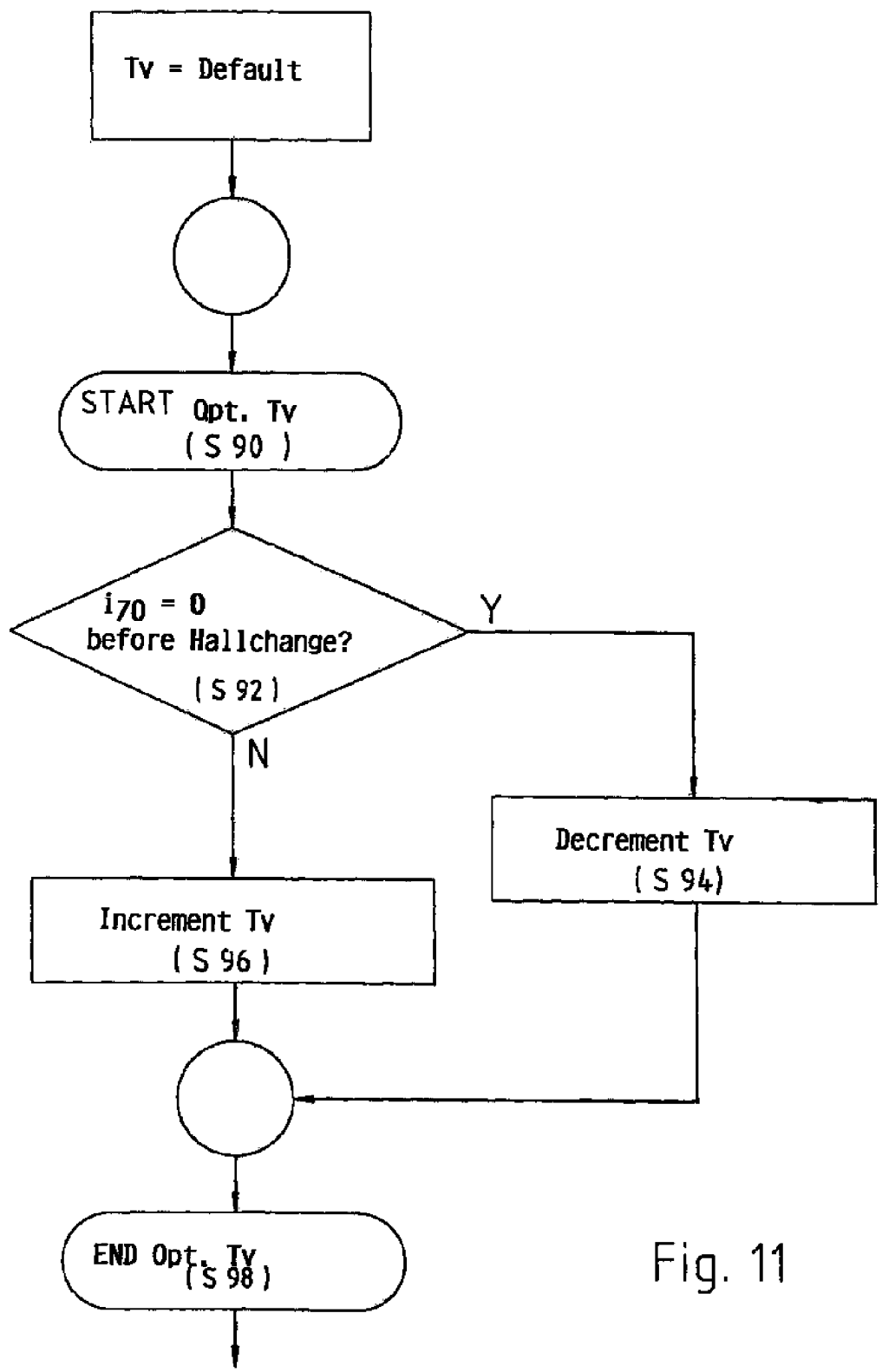
FIG. 11 shows a routine used to set a variable Tv.

The time Tv (FIG. 4), which is set to a default value when the motor is started and at the beginning of which (at moment t64) the "prelude" to commutation begins in each case, can be optimized by µC 26. The corresponding routine is shown in FIG. 11.

This routine for optimizing time Tv begins at step S90 and is called after each Hall change.

S92 checks whether the end of current circulation (t70) was detected before the Hall change. If so, Tv is then reduced in S94 by an interval ΔTv1. If not, Tv is then increased in S96 by an interval ΔTv2 that is larger than interval ΔTv1 in step S94. Optimization ends at step S98.

An optimum value for Tv is thereby established within a few revolutions, even if, for example, the motor rotation speed has changed as a result of external influences.

Problems at Higher-Order Transistor 60

Figure 12:
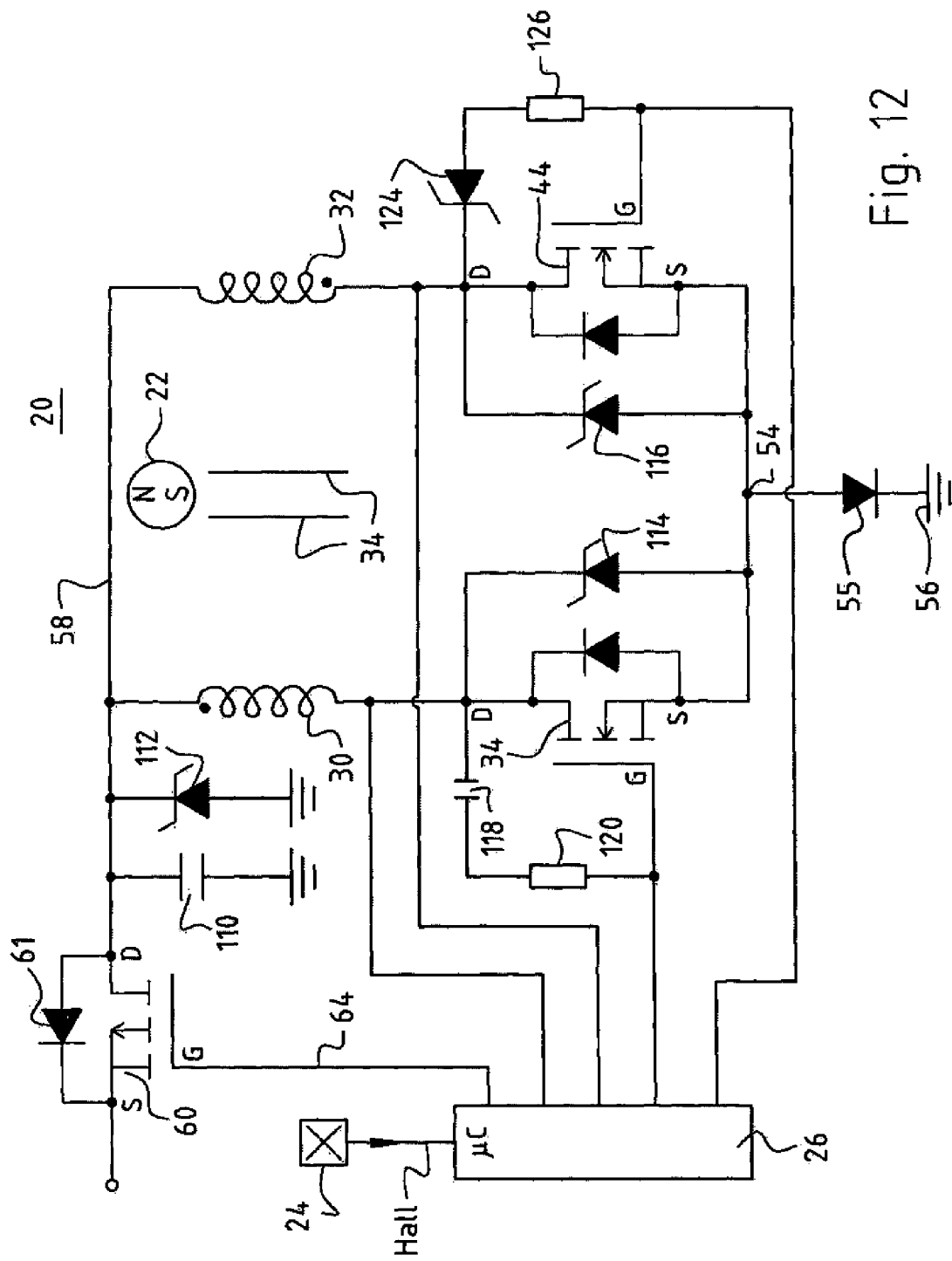
FIG. 12 is a circuit diagram showing, in the manner of a catalog, different variant circuits that can be used, individually or in combination, in the context of the invention.
Figure 13:
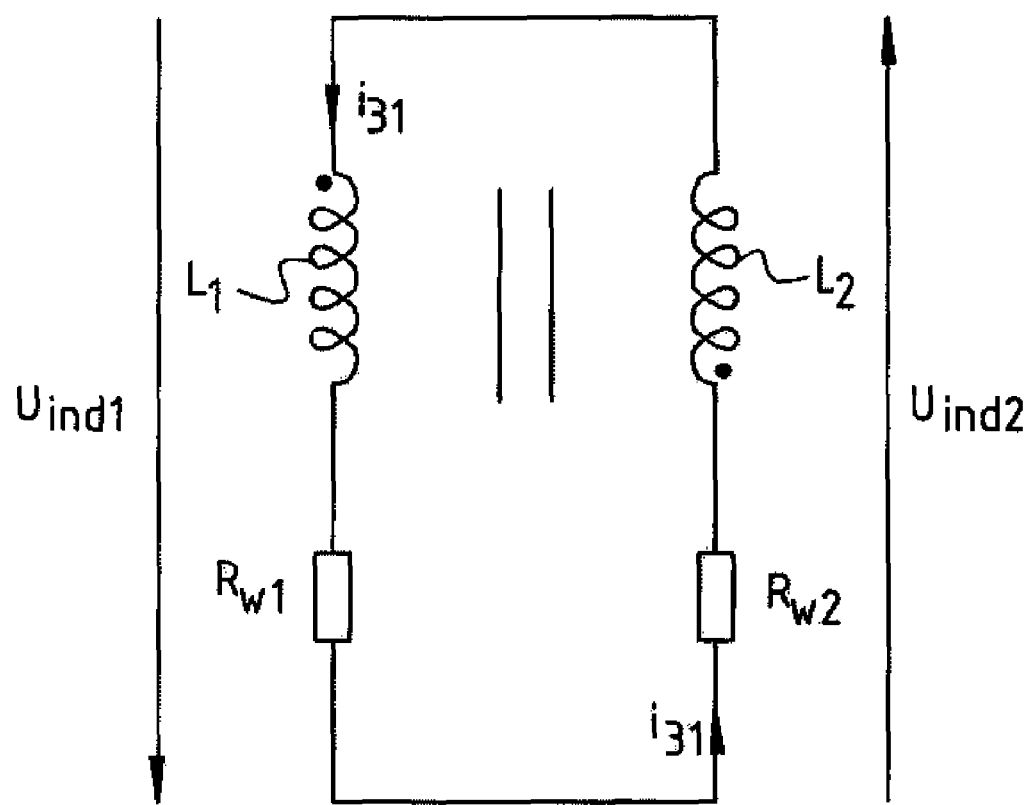
FIG. 13 is a basic circuit diagram that explains why voltage spikes can occur at drain D of higher-order transistor 60 (FIG. 2)

FIG. 13 shows a problem that occurs upon blockage of higher-order transistor 60. At startup or in the context of a change in the load of motor 20, it can happen that higher-order transistor 60 is blocked too late, and a circulating current is therefore still flowing through strands 30, 32 at commutation instant tK1, tK2, etc. Commutation cannot take place in currentless fashion in this case, and protective measures to prevent this must be taken. These are shown in FIG. 12 and can be applied individually or in combination.

Possibilities for Limiting Drain Voltage at Transistors 34 and 44

Possibility 1

Use of a link circuit capacitor 110 (FIG. 12) that absorbs the residual magnetic energy of the winding strand to be switched off, and thereby limits the voltage at link circuit 58. A typical value for this capacitor 110 in the context of the invention is approximately 0.3 μF.

Possibility 2

Limiting the voltage at link circuit 58 using a Zener diode 112.

Possibility 3

Limiting the drain voltages of transistors 34, 44 using Zener diodes 114, 116.

Possibility 4

Limiting the drain voltages of transistors 34, 44 by slow switching (i.e. by limiting di/dt) by means of a series circuit of a capacitor 118 and a resistor 120, which circuit is connected between drain D and gate G. This is depicted only for transistor 34, but for reasons of symmetry is used in the same fashion for transistor 44.

Possibility 5

Limiting the drain voltages of transistors 34, 44 by slow switching of the relevant transistor (i.e. limiting di/dt), by means of a series circuit of a Zener diode 124 and a resistor 126. In this case, a series circuit of this kind is connected between D and G for both transistors 34 and 44.

Possibility 6

Limiting the drain voltages of transistors 34, 44 by means of base diode 55. This prevents a current from flowing from ground 56 to base point 54 when the latter becomes more negative than ground 56. This can happen while a circulating current, e.g. i31, is flowing in motor 20.

Drain Voltage at Higher-Order Transistor 60

When higher-order transistor 60 is switched off, a circulating current i31 (FIG. 2) or i31' (FIG. 3) occurs. In this context (taking the example of FIG. 2) the current goes abruptly to half its value in one winding strand 30 and correspondingly increases in the other winding strand 32, as has been described with reference to FIGS. 1 and 2. These current changes generate corresponding voltages by self-induction. These voltages are depicted in FIG. 13 and are opposite in direction.

Figure 14:
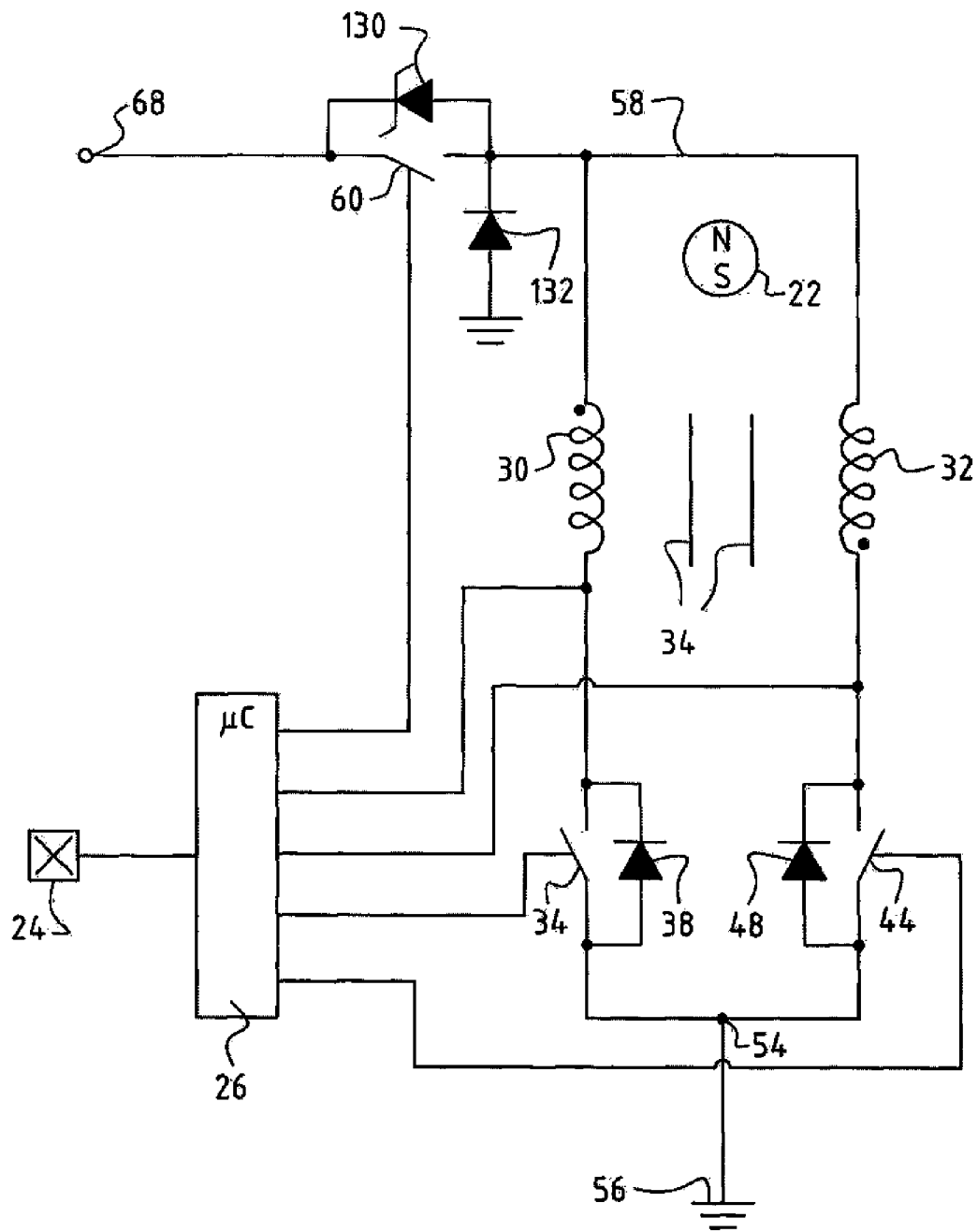
FIG. 14 shows circuit actions that are possible in order to reduce voltage spikes at higher-order transistor 60.

But because the two strands 30, 32 are not coupled in stray-flux-free fashion, the two voltages Uind1 and Uind2 do not entirely cancel each other out. When MOSFET 60 is switched off, a negative voltage spike therefore occurs at its drain D. This spike can be limited by using a Zener diode 130 (FIG. 14). A voltage spike of this kind can also be counteracted by creating a recovery circuit by means of a diode 132 (FIG. 14).

Current Limiting

Upon startup of a fan motor 20, no induced voltage is present when the motor is at a standstill. As a consequence, currents i30, i32 through strands 30, 32 are limited only by the ohmic resistances Rw thereof (FIG. 8). This can result in very high starting currents.

It is known to limit such currents by means of an arrangement for current limiting. For this, a current measuring resistor R is placed in the path of motor current iR (cf. FIG. 15), and as soon as this current reaches a predetermined maximum value, higher-order transistor 60 has supplied to it a PWM (Pulse Width Modulation) signal whose pulse duty factor pwm becomes lower as current iR increases.

In motors according to the existing art, the two transistors 34, 44 are blocked for current limiting purposes, although this creates the above-described problems with power dissipation. This problem can be eliminated if higher-order transistor 60 is used in the context of current limiting in order to interrupt energy supply to motor 20. The reason is that the circulating current flow i31 (or i31') described with reference to FIG. 2 also occurs in this context, and generates a torque. Current limiting can thus be implemented with high efficiency, since (unlike with the known circuits) the energy in the current-carrying strand 30 or 32 is not transformed into heat each time transistor 60 blocks. This energy instead continues to be converted into mechanical energy, and to drive rotor 22.

High currents are produced upon startup of a motor, and the magnetic energy stored in a strand is therefore, according to formula (1), highest during startup; this is why current limiting in accordance with FIG. 15 yields such enormous advantages.

Figure 16:
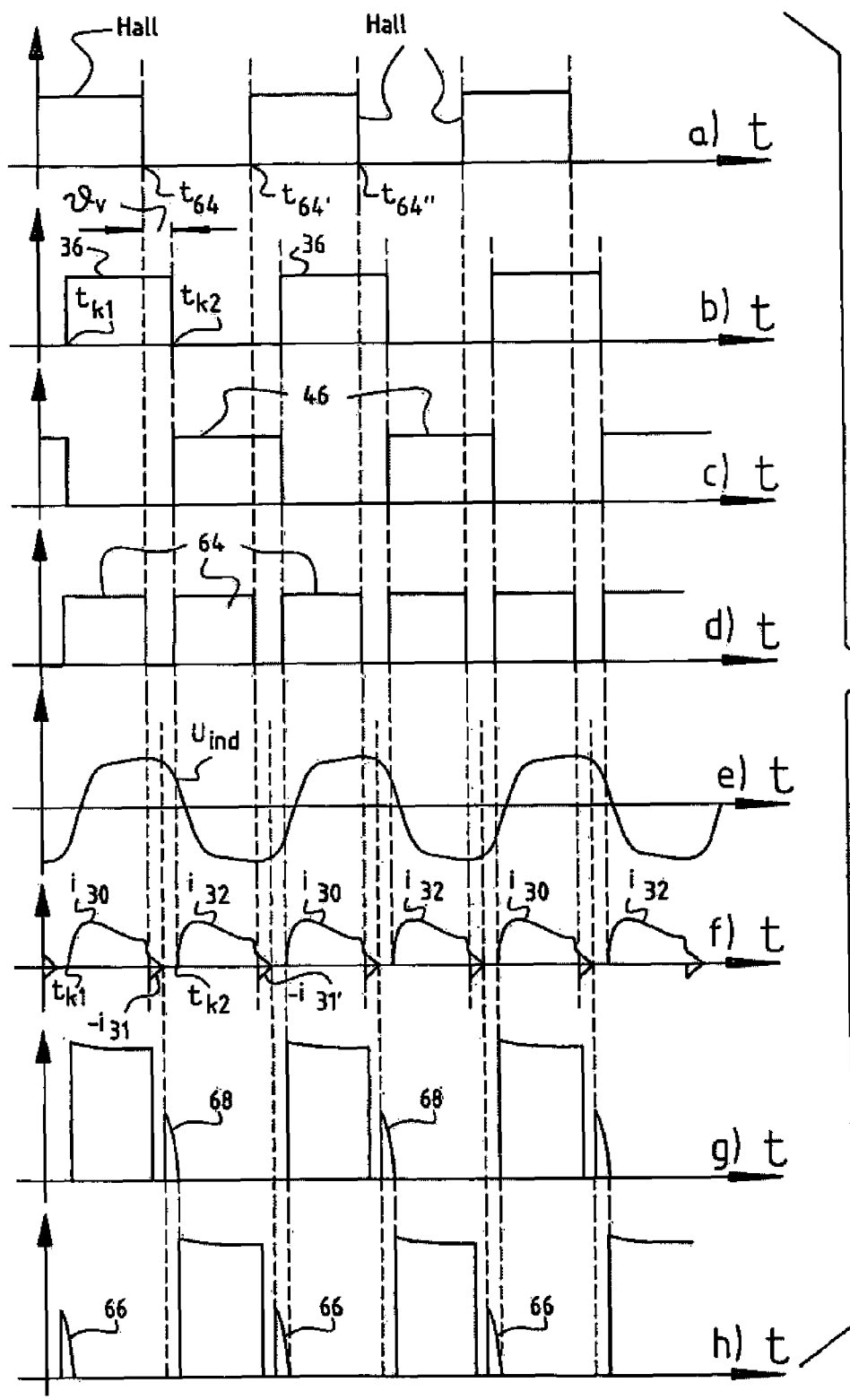
FIG. 16 is a state diagram for a preferred variant of the invention.

FIG. 1 in combination with FIG. 16 shows a further and preferred embodiment of the invention. The reference characters in FIG. 16 have the same meanings as the references in FIGS. 1 to 4, 6, and 7, and the reader is therefore referred to those figures plus their text.

With the variant according to FIGS. 1 to 7, commutation is brought about by the Hall signal, which according to FIGS. 6a) and 6f) switches on current i30 in strand 30 at instant tK1, current i32 in strand 32 at instant tK2, current i30 in strand 30 again at time tK3, etc. These instants correspond to the changes in the Hall signal (FIG. 6a)) from "0" to "1" or vice versa, Hall sensor 34 (FIG. 1) being arranged approximately in the so-called neutral zone of the motor or offset out of the neutral zone by only a few degrees, e.g. 4° el., oppositely to rotation direction 21 (FIG. 1).

Figure 17:
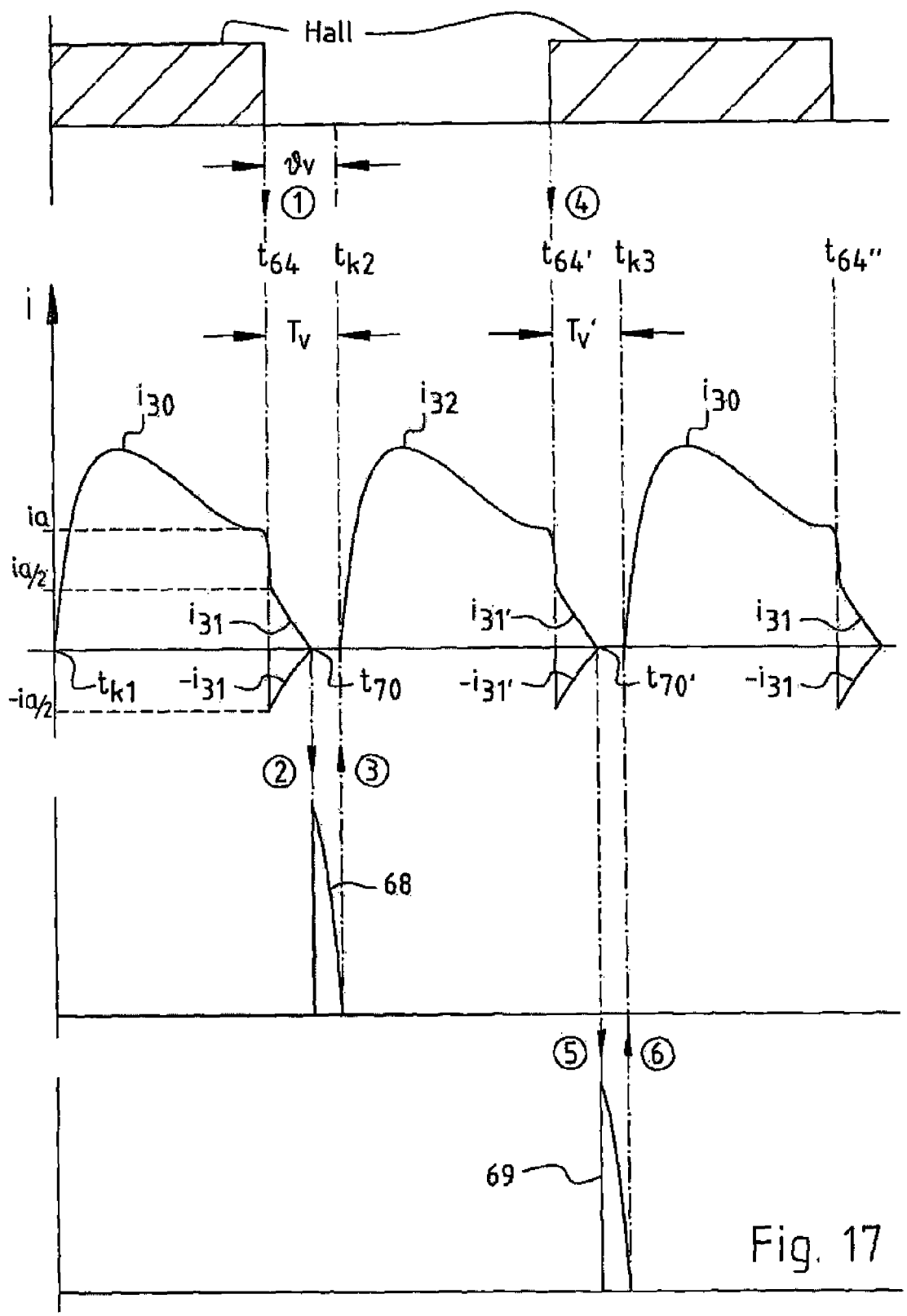
FIG. 17 is a simplified version of FIG. 16 to explain the preferred variant.

In the variant according to FIG. 16, Hall sensor 24 is offset oppositely to rotation direction 21 by a greater angle theta_v (θv, FIGS. 1, 16 and 17). In the example according to FIGS. 16a) and 16b), the offset is e.g. approximately 20° el. The value of this angle of course depends on a number of factors, and must be optimized in each case by experiment. This angle must be sufficiently large to allow the magnetic energy stored in a winding strand at the beginning of a commutation to dissipate before the current in the next winding strand is switched on.

As depicted in FIG. 16, in this case the Hall signal controls not commutation, but rather the blocking of higher-order transistor 60, i.e. the beginning of current circulation, namely instants t64, t64', t64" of FIG. 4.

When the Hall signal changes from "1" to "0" at instant t64 of FIG. 16a), transistor 60 therefore becomes blocked, while transistor 34 that is conductive at that moment remains conductive, so that as shown in FIG. 2, a circulating current i31 flows counterclockwise until said current i31 has gone to zero.

The situation is the same when, at instant t64' of FIG. 16a), the Hall signal changes from "0" to "1". Here again, transistor 60 becomes blocked while transistor 44 that is conductive at that moment remains conductive, so that as shown in FIG. 3, a current i31' flows clockwise until said current i31' has gone to zero.

When this circulating current i31 or i31' has reached a value of zero, a signal that produces commutation is obtained at drain D of the blocked transistor, i.e. of transistor 44 in FIG. 2 and of transistor 34 in FIG. 3.

In the case of FIG. 2, a signal 68 (depicted in FIG. 16g) is obtained from drain D of the blocked transistor 44, and in the case of FIG. 3, a signal 66 is obtained from drain D of the blocked transistor 34, said signal being depicted in FIG. 16h). These signals 68 or 66 produce commutation, i.e. cause current to be switched on in the relevant strand. Signal 68 causes current i32 to be switched on, thus switching on transistor 44; and signal 66 causes current i30 to be switched on, thus switching on transistor 34. This is apparent from what is depicted in FIG. 16.

A great advantage of this variant is that a high-performance μC 26 is not absolutely necessary; instead, an ASIC or a cheap μC is usually sufficient, making the solution according to FIG. 16 more economical.

FIG. 17 shows the variant according to FIG. 16 once again in a simplified diagram.

At instant t64, the Hall signal goes from "1" to "0" and produces, at point j, blockage of third transistor 60, so that circulating current i31 flows. This current becomes zero at instant t70 so that transistor 44 can be blocked losslessly, and at point k it produces a signal 68 at drain D of the non-conductive transistor 44. At point l, i.e. at instant tK2, this signal 68 produces commutation, i.e. switching-on, of the (hitherto blocked) transistors 44 and 60, as depicted in FIG. 3, so that current i32 flows through strand 32.

At instant t64', the Hall signal goes from "0" to "1". The result is that at point m, third transistor 60 is blocked, and a circulating current i31' flows in accordance with FIG. 3; this current becomes zero at instant t70', so that transistor 64 can then be losslessly blocked.

As a result, at point n signal 69 occurs at drain D of the non-conductive transistor 34, and at point o this causes commutation, i.e. causes the (hitherto blocked) transistors 34 and 60 to be switched on.

The processes then repeat continuously in the manner described. It is advantageous that, because the Hall signal is utilized for initiation of the commutation procedure, particular calculation procedures, that would otherwise be needed in order to calculate instant t64 on the basis of various data, can be eliminated.

The invention in its different variants yields, especially, the following advantages:

Losses, and therefore heat production, in power stage transistors 34, 44 are reduced, because the magnetic energy present at the beginning of a commutation in a winding strand 30 or 32 is largely converted into mechanical energy and does not heat up the relevant power-stage transistor.

The invention consequently makes it possible to use lower-performance electronic assemblies, thus saving space and cost. For example, transistors of somewhat lower performance, and therefore smaller overall size, can be used.

Because link circuit capacitor 110 (FIG. 12) can be smaller than in the case of known approaches, or sometimes can be entirely omitted, the motor becomes smaller and the result is a longer motor service life, as described earlier.

The efficiency of the motor increases.

In drive systems such as those used, for example, for compact fans, there is an increase in power density and thus in fan performance for a specific overall size.

It is possible to provide a current limiting system, which in particular reduces current spikes upon startup of such motors.

Numerous variants and modifications are of course possible within the scope of the present invention.

What is claimed is:

1. A method of operating an electronically commutated motor (20) on a DC power network, which motor includes
a permanent-magnet rotor (22);
a first series circuit (40) in which a first stator winding strand (30) is connected in series with a first controllable semiconductor switch (34);
a second series circuit (50) in which a second stator winding strand (32) is connected in series with a second controllable semiconductor switch (44);
which two series circuits (40, 50) are connected in parallel to form a parallel circuit (52);
a third controllable semiconductor switch (60), arranged in a supply lead to said parallel circuit (52), for controlling energy supply to the motor (20) from the DC power network;
comprising the steps of:
alternately, influenced by a rotational position of the rotor, activating the possibility of energy supply from the DC power network to one winding strand during a potential current-flow phase, and deactivating the possibility of energy supply from the DC power network to the other winding strand during said potential current-flow phase,
the potential current-flow phase of the one winding strand being separated in time, by a respective commutation procedure, from the potential current-flow phase of the other winding strand;
during a potential current-flow phase, at a switchover instant (t64) switching over the third controllable semiconductor switch (60), for the purpose of initiating a commutation procedure, from a conductive into a non-conductive state, in order to interrupt energy supply to said winding strands from the DC power network;
maintaining in a conductive state whichever semiconductor switch (34, 44) was conductive at the switchover instant (t64), so that, after blockage of the third controllable semiconductor switch (60), a circulating current (i31) flows in the parallel circuit (50) and thereby generates a driving torque in the motor;
monitoring amplitude of said circulating current;
when said circulating current reaches a predetermined low absolute value (|i31|), blocking that one of said first and second semiconductor switches which was hitherto conductive;
depending on the rotational position of the rotor (22), as part of a commutation procedure, deactivating the potential current-flow phase of the one strand, and activating the potential current-flow phase of the other strand; and
again switching on the third semiconductor switch (60), in order to reactivate the possibility of energy supply to the motor (20) from the DC power network.

2. The method according to claim 1, wherein
a respective recovery diode (38, 48) is connected antiparallel with each of the first and the second controllable semiconductor switches (34, 44).

3. The method according to claim 1, wherein
at least one of the semiconductor switches (34, 44, 60) is implemented as a field effect transistor.

4. The method according to claim 1, further comprising
connecting one winding strand (30) to a terminal (D) of the semiconductor switch (34) associated therewith,
connecting the other terminal (S) of said semiconductor switch (34) by an electrical connection (54) to the corresponding other terminal (S) of the semiconductor switch (44) connected to the other winding strand (32), and providing, in a supply lead to said electrical connection (54), a blocking element (55) that enables only a unidirectional current.

5. The method according to claim 1, further comprising arranging the winding strands (30, 32) with respect to each other in order to create a magnetic coupling (34) therebetween.

6. The method according to claim 5, further comprising providing a stator lamination stack (34) in order to produce the magnetic coupling, which lamination stack is arranged so that it magnetically couples the winding strands (30, 32).

7. The method according to claim 1, further comprising connecting a diode (61; 130) antiparallel with the semiconductor switch (60) arranged in the supply lead to the parallel circuit (52).

8. The method according to claim 7, wherein the antiparallel-connected diode is implemented as a Zener diode (130).

9. The method according to claim 1, further comprising connecting a respective semiconductor switch (34, 44) in series with each stator winding strand (30, 32), and providing an RC element (118, 120) between the connection (D) of said semiconductor switch (34, 44) to the associated winding strand (30, 32) on the one hand and the control electrode (G) of the relevant semiconductor switch (34, 44) on the other hand.

10. The method according to claim 1, further comprising connecting the semiconductor switch (60) arranged in the supply lead to the parallel circuit (52), at its output (58) connected to the winding strands (30, 32), to the one electrode of a diode (112; 132) whose other electrode is connected to another terminal (56) of the motor (20), in order thereby to limit voltage spikes occurring, upon switching procedures of said semiconductor switch (60), at the latter's output (58) connected to the parallel circuit (52).

11. The method according to claim 1, further comprising in order to sense a predetermined low value of the circulating current (i31), monitoring and evaluating voltage at at least one of the terminals (D) of the semiconductor switches connected in series with said stator winding strands.

12. The method according to claim 11, further comprising monitoring the relevant terminal (D) to ascertain whether a voltage induced by the rotating rotor (22) in an associated stator winding strand (30, 32) is measurable at said terminal.

13. The method according to claim 12, further comprising sensing the amplitude of said induced voltage.

14. The method according to claim 12, further comprising if the induced voltage (66, 68) is not measurable, displacing (S94), in an advance direction, the instant (t64) at which the third controllable semiconductor switch (60) is switched over from a conductive state to a non-conductive state.

15. The method according to claim 13, further comprising if the amplitude of the induced voltage (FIG. 6: 66, 68) exceeds a predetermined value (A), displacing (S98), in a retard direction, the instant (t64) at which the third controllable semiconductor switch (60) is switched over from a conductive state to a non-conductive state.

16. An electronically commutated motor (20) for operation on a DC power source, said motor comprising:

terminals (56, 62) for connection to a DC power source (63);

a permanent-magnet rotor (22);

a first series circuit (40) in which a first stator winding strand (30) is connected in series with a first controllable semiconductor switch (34);

a second series circuit (50) in which a second stator winding strand (32) is connected in series with a second controllable semiconductor switch (44);

said two series circuits (40, 50) being connected in parallel to form a parallel circuit (52);

a third controllable semiconductor switch (60), arranged in a supply lead to said parallel circuit (52), for controlling energy supplied to the motor (20) from the DC power source (63);

and having a control apparatus (26) that is implemented to carry out, in operation, the steps of:

alternately, influenced by a rotational position of the rotor, activating the possibility of energy supply from the DC power network to one winding strand during a potential current-flow phase, and deactivating the possibility of energy supply from the DC power network to the other winding strand during said potential current-flow phase, the potential current-flow phase of the one winding strand being separated in time, by a respective commutation procedure, from the potential current-flow phase of the other winding strand;

during a potential current-flow phase, at a switchover instant (t64) blocking the third controllable semiconductor switch (60), for the purpose of initiating a commutation procedure;

maintaining in a conductive state whichever semiconductor switch in series with a winding strand (34, 44) was conductive at the switchover instant (t64), so that, after blockage of the third controllable semiconductor switch (60), a circulating current (i31; i31') flows, in operation, in the parallel circuit (50) and thereby generates a driving torque in the motor;

monitoring amplitude of said circulating current;

when said circulating current reaches a predetermined low absolute value (|i31|), blocking that one of said first and second semiconductor switches (34, 44) which was hitherto conductive;

depending on the rotational position of the rotor (22), as part of a commutation procedure, deactivating the potential current-flow phase of the one strand, and activating the potential current-flow phase of the other strand; and again switching on the third semiconductor switch (60).

17. The motor according to claim 16, wherein a respective recovery diode (38, 48) is connected antiparallel with each of the first and the second controllable semiconductor switches (34, 44).

18. The motor according to claim 6, wherein at least one of the semiconductor switches (34, 44, 60) is implemented as a field effect transistor.

19. The motor according to claim 16, wherein one winding strand (30) is connected to a terminal (D) of the semiconductor switch (34) associated therewith, and the other terminal (S) of said semiconductor switch (34) is connected by an electrical connection (54) to the corresponding other terminal (S) of the semiconductor switch (44) connected to the other winding strand (32), and a blocking element (55) that enables only a unidirectional current is provided in a supply lead to said electrical connection (54).

20. The motor according to claim 16, wherein
the winding strands (30, 32) exhibit a magnetic coupling (56), due to a bifilar winding configuration of the winding strands (30, 32).

21. The motor according to claim 20,
which further comprises a stator lamination stack (34) that is arranged so that in magnetically couples the winding strands (30, 32) with one another.

22. The motor according to claim 16, further comprising
a diode (61; 130), connected antiparallel with the semiconductor switch (60) arranged in the supply lead to the parallel circuit (52).

23. The motor according to claim 22, wherein the antiparallel-connected diode is a Zener diode (130).

24. The motor according to claim 16,
a respective semiconductor switch (34, 44) is connected in series with each winding strand (30, 32), and
a respective RC element (118, 120) is provided between the connection (D) of the semiconductor switch (34, 44) and associated winding strand (30, 32) on the one hand and the control electrode (D) of the relevant semiconductor switch (34, 44) on the other hand, in order to slow down switching procedures in said semiconductor switch.

25. The motor according to claim 16, wherein
the semiconductor switch (60), arranged in the supply lead to the parallel circuit (52), is connected, at its output (58) connected to the winding strands (30, 32), to one electrode of a diode (112; 132) whose other electrode is connected to another terminal (56) of the motor (20), in order thereby to limit voltage spikes that occur, in operation, upon switching procedures of said supply lead semiconductor switch (60), at the latter's output (58) connected to the parallel circuit (52).

26. The motor according to claim 16, further comprising, in order to sense a predetermined low value of the circulating current (i31),
an apparatus (26) which monitors voltage at at least one of the terminals (D) of the semiconductor switches (34, 44) connected in series with a stator winding strand (30, 32).

27. The motor according to claim 26, wherein
the monitoring apparatus (26) is implemented to sense, at least in a predetermined rotational position range of the rotor (22), any occurrence of a voltage (66, 68) induced by the rotating rotor (22) in an associated stator winding strand (30, 32).

28. The motor according to claim 27, wherein
the apparatus (26) is implemented to sense the magnitude of the amplitude of said induced voltage.

29. The motor according to claim 27, wherein
the apparatus (26) is implemented, if the induced voltage is not measurable, to temporally displace in the advance direction (S94) the instant (t64) at which the third controllable semiconductor switch (60) is switched off.

30. The motor according to claim 28, wherein
the apparatus (26) is implemented, if the amplitude of the induced voltage exceeds a predetermined value (A), to temporally displace in the retard direction (S98) the instant (t64) at which the third controllable semiconductor switch (60) is switched off.

31. The motor according to claim 16, further comprising
a rotor position sensor (24; 24') generating, in operation, an output signal (Hall) which is applied to the control apparatus (26).

32. The motor according to claim 31, wherein
the rotor position sensor (24) is arranged so that its output signal enables control of the beginning of the current (i30, i32) in a stator winding strand (30, 32) that is to be switched on.

33. The motor according to claim 31, wherein
the rotor position sensor (24') is arranged so that its output signal enables control of the switchover instant (t64) at which the third controllable semiconductor switch (60) is blocked for the purpose of initiating a commutation procedure.

34. The motor according to claim 33, wherein
the rotor position sensor (24') is offset approximately one-eighth of a complete electrical revolution, oppositely to the rotation direction (21), out of a neutral zone.

\* \* \* \* \*